(12) United States Patent
Staples

(10) Patent No.: US 7,984,566 B2
(45) Date of Patent: *Jul. 26, 2011

(54) SYSTEM AND METHOD EMPLOYING TURBOFAN JET ENGINE FOR DRYING BULK MATERIALS

(76) Inventor: Wesley A. Staples, Palatka, FL (US)

(*) Notice: Subject to any disclaimer, the term of this patent is extended or adjusted under 35 U.S.C. 154(b) by 299 days.

This patent is subject to a terminal disclaimer.

(21) Appl. No.: 11/676,373

(22) Filed: Feb. 19, 2007

(65) Prior Publication Data

US 2008/0000100 A1 Jan. 3, 2008

Related U.S. Application Data

(63) Continuation-in-part of application No. 11/194,488, filed on Aug. 1, 2005, now Pat. No. 7,178,262, and a continuation-in-part of application No. 10/975,032, filed on Oct. 27, 2004, now Pat. No. 6,944,967.

(60) Provisional application No. 60/514,477, filed on Oct. 27, 2003.

(51) Int. Cl.
*F26B 21/06* (2006.01)

(52) U.S. Cl. ............... 34/90; 34/183; 34/191; 159/4.02; 428/409; 60/327; 60/685; 417/398; 431/12; 166/302

(58) Field of Classification Search ............ 34/90, 183, 34/191; 159/4.02; 166/302; 428/409; 131/12; 60/327, 685; 417/398
See application file for complete search history.

(56) References Cited

U.S. PATENT DOCUMENTS

| | | | | | |
|---|---|---|---|---|---|
| 1,453,711 | A | * | 5/1923 | Hoting | 68/20 |
| 2,074,456 | A | * | 3/1937 | Carleton | 502/5 |
| 2,225,428 | A | * | 12/1940 | Christensen | 426/624 |
| 2,316,670 | A | * | 4/1943 | Allen et al. | 562/33 |
| 2,351,091 | A | * | 6/1944 | Bar | 34/594 |
| 2,435,927 | A | * | 2/1948 | Manning et al. | 241/17 |
| 2,625,791 | A | * | 1/1953 | Yellott | 60/39.464 |
| 2,882,912 | A | * | 4/1959 | Reeg et al. | 134/155 |
| 2,921,383 | A | * | 1/1960 | Morris | 159/4.2 |
| 2,932,864 | A | * | 4/1960 | Mellen, Jr. et al. | 164/516 |
| 3,212,553 | A | * | 10/1965 | Cathala | 423/578.1 |
| 3,251,291 | A | * | 5/1966 | Thompson et al. | 99/470 |
| 3,270,432 | A | * | 9/1966 | Barbareschi | 34/92 |
| 3,320,076 | A | * | 5/1967 | Sutton | 501/150 |
| 3,371,629 | A | * | 3/1968 | Engdahl et al. | 110/216 |
| 3,402,753 | A | * | 9/1968 | Thomas | 159/47.1 |
| 3,436,124 | A | * | 4/1969 | Smith et al. | 406/75 |
| 3,586,515 | A | * | 6/1971 | Anderson | 26/417 |

(Continued)

FOREIGN PATENT DOCUMENTS

DE 3220620 A1 * 12/1983

(Continued)

*Primary Examiner* — Stephen M. Gravini
(74) *Attorney, Agent, or Firm* — Allen, Dyer, Doppelt, Milbrath & Gilchrist P.A.

(57) ABSTRACT

An air drying system and process employs a turbofan jet engine for producing high quality dried products. The air drying system uses both thermal and non-thermal air drying. The turbofan jet engine is housed within an air distribution chamber for directing exhaust air and bypass air from the jet engine into a product drying tube, where it is dried through a combination of thermal drying from heat content in an engine exhaust, and by the kinetic energy of air flowing past the product traveling through the drying tube, that may include a physical impediment for retarding retard the speed of the product solids flowing in the air stream through the tube.

27 Claims, 13 Drawing Sheets

U.S. PATENT DOCUMENTS

| | | | | |
|---|---|---|---|---|
| 3,592,395 A | * | 7/1971 | Lockwood et al. | 241/18 |
| 3,618,655 A | | 11/1971 | Lockwood | |
| 3,668,145 A | * | 6/1972 | Belter et al. | 502/435 |
| 3,771,947 A | * | 11/1973 | Cook | 432/95 |
| 3,852,408 A | * | 12/1974 | Ewan et al. | 423/243.1 |
| 3,852,409 A | * | 12/1974 | Martin et al. | 423/243.08 |
| 3,853,498 A | | 12/1974 | Bailie | |
| 3,859,174 A | * | 1/1975 | Taylor | 203/10 |
| 4,051,771 A | * | 10/1977 | Miyata et al. | 99/276 |
| 4,053,653 A | * | 10/1977 | Miyata et al. | 241/19 |
| 4,082,498 A | * | 4/1978 | Offergeld et al. | 432/14 |
| 4,106,892 A | * | 8/1978 | Haga et al. | 432/58 |
| 4,141,701 A | * | 2/1979 | Ewan et al. | 95/217 |
| 4,152,465 A | * | 5/1979 | Kijima et al. | 426/455 |
| 4,158,449 A | * | 6/1979 | Sun et al. | 244/136 |
| 4,180,185 A | * | 12/1979 | Yamamoto et al. | 222/57 |
| 4,196,773 A | * | 4/1980 | Trumpler | 165/62 |
| 4,226,668 A | * | 10/1980 | Ferguson | 159/4.02 |
| 4,226,670 A | * | 10/1980 | Ferguson et al. | 159/16.1 |
| 4,239,804 A | | 12/1980 | Van Kuiken, Jr. | |
| 4,254,616 A | * | 3/1981 | Siminski et al. | 60/39.12 |
| 4,305,620 A | * | 12/1981 | Hart | 299/7 |
| 4,314,513 A | * | 2/1982 | Berthiller | 110/224 |
| 4,334,366 A | | 6/1982 | Lockwood | |
| 4,377,066 A | * | 3/1983 | Dickinson | 60/775 |
| 4,395,830 A | * | 8/1983 | Lockwood | 34/365 |
| 4,425,763 A | * | 1/1984 | Porta et al. | 60/693 |
| 4,430,046 A | * | 2/1984 | Cirrito | 417/55 |
| 4,433,020 A | * | 2/1984 | Narukawa et al. | 428/113 |
| 4,584,090 A | * | 4/1986 | Farnsworth | 208/80 |
| 4,592,290 A | * | 6/1986 | Berthiller | 110/346 |
| 4,609,328 A | * | 9/1986 | Cirrito | 417/55 |
| 4,695,248 A | * | 9/1987 | Gray | 432/58 |
| 4,699,588 A | * | 10/1987 | Zinn et al. | 432/38 |
| 4,701,126 A | | 10/1987 | Gray et al. | |
| 4,741,913 A | * | 5/1988 | Satake | 426/483 |
| 4,769,923 A | * | 9/1988 | Chang | 34/582 |
| 4,770,626 A | * | 9/1988 | Zinn et al. | 431/1 |
| 4,859,248 A | | 8/1989 | Thaler et al. | |
| 4,909,731 A | * | 3/1990 | Zinn et al. | 432/58 |
| 4,921,886 A | * | 5/1990 | Ewan et al. | 423/235 |
| 5,015,171 A | * | 5/1991 | Zinn et al. | 431/1 |
| 5,050,375 A | * | 9/1991 | Dickinson | 60/39.12 |
| 5,059,404 A | * | 10/1991 | Mansour et al. | 423/201 |
| 5,176,723 A | * | 1/1993 | Liu et al. | 95/216 |
| 5,199,354 A | * | 4/1993 | Wood | 110/241 |
| 5,252,061 A | | 10/1993 | Ozer et al. | |
| 5,261,225 A | * | 11/1993 | Dickinson | 60/39.55 |
| 5,306,481 A | * | 4/1994 | Mansour et al. | 423/652 |
| 5,352,275 A | * | 10/1994 | Nath et al. | 95/117 |
| 5,388,985 A | * | 2/1995 | Musil et al. | 431/116 |
| 5,505,567 A | | 4/1996 | Scott | |
| 5,536,488 A | * | 7/1996 | Mansour et al. | 423/652 |
| 5,592,811 A | * | 1/1997 | Dodge et al. | 60/775 |
| 5,613,805 A | * | 3/1997 | Schmid | 405/128.2 |
| 5,637,192 A | * | 6/1997 | Mansour et al. | 162/29 |
| 5,651,191 A | * | 7/1997 | Walunas et al. | 34/236 |
| 5,651,796 A | * | 7/1997 | Kubotani et al. | 23/302 R |
| 5,658,142 A | | 8/1997 | Kitchen et al. | |
| 5,673,553 A | * | 10/1997 | Maese et al. | 60/801 |
| 5,718,112 A | * | 2/1998 | Dodge et al. | 60/783 |
| 5,779,761 A | * | 7/1998 | Armstrong et al. | 75/370 |
| 5,832,713 A | * | 11/1998 | Maese et al. | 60/783 |
| 5,842,289 A | | 12/1998 | Chandran et al. | |
| 5,954,911 A | * | 9/1999 | Bergman et al. | 156/345.29 |
| 6,003,305 A | * | 12/1999 | Martin et al. | 60/274 |
| 6,013,158 A | | 1/2000 | Wootten | |
| 6,098,904 A | * | 8/2000 | Davidson et al. | 239/590 |
| 6,149,765 A | * | 11/2000 | Mansour et al. | 162/29 |
| 6,158,145 A | * | 12/2000 | Landon et al. | 34/364 |
| 6,200,542 B1 | * | 3/2001 | Poles et al. | 423/210 |
| 6,214,303 B1 | * | 4/2001 | Hoke et al. | 423/210 |
| 6,289,666 B1 | * | 9/2001 | Ginter | 60/775 |
| 6,293,121 B1 | * | 9/2001 | Labrador | 62/304 |
| 6,327,994 B1 | * | 12/2001 | Labrador | 114/382 |
| 6,340,066 B1 | * | 1/2002 | Dettling et al. | 180/54.1 |
| 6,354,018 B1 | * | 3/2002 | Swithenbank | 34/364 |
| 6,391,267 B1 | * | 5/2002 | Martin et al. | 422/173 |
| 6,422,828 B1 | * | 7/2002 | Beerlings | 417/171 |
| 6,485,296 B1 | | 11/2002 | Bender et al. | 432/58 |
| 6,513,345 B1 | * | 2/2003 | Betting et al. | 62/637 |
| 6,517,899 B1 | * | 2/2003 | Hoke et al. | 427/207.1 |
| 6,564,556 B2 | * | 5/2003 | Ginter | 60/775 |
| 6,616,903 B2 | * | 9/2003 | Poles et al. | 423/210 |
| 6,675,437 B1 | * | 1/2004 | York | 15/321 |
| 6,790,349 B1 | * | 9/2004 | Sawyer | 210/173 |
| 6,818,254 B1 | * | 11/2004 | Hoke et al. | 427/421.1 |
| 6,862,819 B2 | * | 3/2005 | Vrbanac et al. | 34/221 |
| 6,863,984 B2 | * | 3/2005 | Hoke et al. | 428/447 |
| RE38,784 E | * | 8/2005 | Maese et al. | 60/801 |
| 6,944,967 B1 | * | 9/2005 | Staples | 34/183 |
| RE38,815 E | * | 10/2005 | Maese et al. | 60/783 |
| 6,955,052 B2 | * | 10/2005 | Primlani | 60/776 |
| 6,966,942 B2 | * | 11/2005 | Broadbent | 95/64 |
| 7,024,796 B2 | * | 4/2006 | Carin et al. | 34/363 |
| 7,024,800 B2 | * | 4/2006 | Carin et al. | 34/576 |
| 7,070,645 B2 | * | 7/2006 | Hiltunen et al. | 95/271 |
| 7,083,829 B2 | * | 8/2006 | Hoke et al. | 427/421.1 |
| 7,134,285 B2 | * | 11/2006 | Primlani | 60/784 |
| 7,178,262 B2 | * | 2/2007 | Staples | 34/183 |
| RE39,596 E | * | 5/2007 | Dodge et al. | 60/772 |
| 7,255,954 B2 | * | 8/2007 | Hampden-Smith et al. | 429/483 |
| 7,404,837 B2 | * | 7/2008 | Killion et al. | 55/421 |
| 7,487,601 B2 | * | 2/2009 | Carin et al. | 34/381 |
| 7,610,692 B2 | * | 11/2009 | Carin et al. | 34/388 |
| 7,617,617 B2 | * | 11/2009 | Gorbell et al. | 34/60 |
| 7,621,129 B2 | * | 11/2009 | DuBois | 60/641.2 |
| 7,685,737 B2 | * | 3/2010 | Gorbell et al. | 34/86 |
| 7,732,372 B2 | * | 6/2010 | Hampden-Smith et al. | 502/407 |
| 7,735,186 B1 | * | 6/2010 | Vogel | 15/320 |
| 7,737,397 B2 | * | 6/2010 | Morrisroe | 250/288 |
| 7,742,167 B2 | * | 6/2010 | Morrisroe | 356/316 |
| 7,866,060 B2 | * | 1/2011 | Carin et al. | 34/487 |
| 7,866,386 B2 | * | 1/2011 | Beer et al. | 166/258 |
| 7,866,388 B2 | * | 1/2011 | Bravo | 166/267 |
| 7,882,646 B2 | * | 2/2011 | Gorbell et al. | 34/514 |
| 2001/0021363 A1 | | 9/2001 | Poles et al. | 423/230 |
| 2001/0031693 A1 | * | 10/2001 | Hoke et al. | 502/80 |
| 2002/0018742 A1 | * | 2/2002 | Hoke et al. | 423/219 |
| 2002/0074174 A1 | * | 6/2002 | Dettling et al. | 180/68.1 |
| 2002/0078868 A1 | * | 6/2002 | McHenry et al. | 110/342 |
| 2002/0176809 A1 | * | 11/2002 | Siess | 422/121 |
| 2003/0014959 A1 | * | 1/2003 | Ginter | 60/39.26 |
| 2003/0059356 A1 | * | 3/2003 | Hoke et al. | 423/210 |
| 2003/0164309 A1 | * | 9/2003 | Nakamura et al. | 205/746 |
| 2003/0166466 A1 | * | 9/2003 | Hoke et al. | 502/439 |
| 2003/0177904 A1 | * | 9/2003 | Broadbent | 95/154 |
| 2003/0198849 A1 | * | 10/2003 | Hampden-Smith et al. | 429/30 |
| 2004/0005252 A1 | * | 1/2004 | Siess | 422/186.3 |
| 2004/0086774 A1 | * | 5/2004 | Munoz et al. | 429/42 |
| 2004/0103786 A1 | * | 6/2004 | Hiltunen et al. | 95/271 |
| 2004/0238406 A1 | * | 12/2004 | Kanataev et al. | 208/108 |
| 2005/0084791 A1 | * | 4/2005 | Hackler et al. | 430/200 |
| 2005/0100492 A1 | * | 5/2005 | Hoke et al. | 423/219 |
| 2005/0120715 A1 | * | 6/2005 | Labrador | 60/618 |
| 2005/0126177 A1 | * | 6/2005 | Primlani | 60/776 |
| 2005/0172631 A1 | * | 8/2005 | Primlani | 60/698 |
| 2005/0223719 A1 | * | 10/2005 | Killion et al. | 62/93 |
| 2005/0230659 A1 | * | 10/2005 | Hampden-Smith et al. | 252/189 |
| 2006/0010712 A1 | * | 1/2006 | Carin et al. | 34/443 |
| 2006/0010714 A1 | * | 1/2006 | Carin et al. | 34/514 |
| 2006/0041448 A1 | * | 2/2006 | Patterson et al. | 705/1 |
| 2006/0053653 A1 | * | 3/2006 | Staples | 34/443 |
| 2006/0064986 A1 | * | 3/2006 | Ginter et al. | 60/775 |
| 2006/0101665 A1 | * | 5/2006 | Carin et al. | 34/513 |
| 2006/0101881 A1 | * | 5/2006 | Carin et al. | 71/21 |
| 2006/0124444 A1 | * | 6/2006 | Nakamura et al. | 204/164 |
| 2006/0201024 A1 | * | 9/2006 | Carin et al. | 34/576 |
| 2006/0254079 A1 | * | 11/2006 | Gorbell et al. | 34/363 |
| 2006/0254080 A1 | * | 11/2006 | Carin et al. | 34/363 |
| 2006/0254081 A1 | * | 11/2006 | Carin et al. | 34/576 |
| 2006/0265954 A1 | * | 11/2006 | Dogru et al. | 48/197 R |
| 2006/0285108 A1 | * | 12/2006 | Morrisroe | 356/316 |
| 2006/0286492 A1 | * | 12/2006 | Morrisroe | 431/2 |
| 2007/0007198 A1 | * | 1/2007 | Balvanz | 210/512.1 |
| 2007/0163142 A1 | * | 7/2007 | Carin et al. | 34/282 |
| 2007/0251120 A1 | * | 11/2007 | Connell | 34/576 |

| Publication | Date | Inventor | Class |
|---|---|---|---|
| 2007/0270057 A1* | 11/2007 | Feldman et al. | 441/1 |
| 2008/0000100 A1* | 1/2008 | Staples | 34/345 |
| 2008/0061004 A1* | 3/2008 | Balvanz | 210/710 |
| 2008/0104858 A1* | 5/2008 | Carin et al. | 34/282 |
| 2008/0105019 A1* | 5/2008 | Carin et al. | 71/15 |
| 2008/0110043 A1* | 5/2008 | Carin et al. | 34/487 |
| 2008/0147241 A1* | 6/2008 | Tsangaris et al. | 700/273 |
| 2008/0155985 A1* | 7/2008 | Labrador | 60/698 |
| 2008/0172899 A1* | 7/2008 | Carin et al. | 34/90 |
| 2008/0173810 A1* | 7/2008 | Morrisroe | 250/288 |
| 2008/0189979 A1* | 8/2008 | Carin et al. | 34/576 |
| 2008/0209807 A1* | 9/2008 | Tsangaris et al. | 48/89 |
| 2008/0210089 A1* | 9/2008 | Tsangaris et al. | 95/90 |
| 2008/0222956 A1* | 9/2008 | Tsangaris et al. | 48/77 |
| 2008/0277265 A1* | 11/2008 | Tsangaris et al. | 204/157.15 |
| 2009/0000184 A1* | 1/2009 | Garwood | 44/307 |
| 2009/0000194 A1* | 1/2009 | Fan et al. | 48/199 R |
| 2009/0004715 A1* | 1/2009 | Trimbur et al. | 435/166 |
| 2009/0011480 A1* | 1/2009 | Trimbur et al. | 435/134 |
| 2009/0013867 A1* | 1/2009 | McCutchen | 95/35 |
| 2009/0020456 A1* | 1/2009 | Tsangaris et al. | 208/133 |
| 2009/0035842 A1* | 2/2009 | Trimbur et al. | 435/254.22 |
| 2009/0047721 A1* | 2/2009 | Trimbur et al. | 435/167 |
| 2009/0061493 A1* | 3/2009 | Trimbur et al. | 435/157 |
| 2009/0062559 A1* | 3/2009 | Doyle et al. | 554/169 |
| 2009/0098289 A1* | 4/2009 | Deininger et al. | 427/236 |
| 2009/0098491 A1* | 4/2009 | Hackler et al. | 430/348 |
| 2009/0120091 A1* | 5/2009 | DuBois | 60/641.3 |
| 2009/0126260 A1* | 5/2009 | Aravanis et al. | 44/308 |
| 2009/0148918 A1* | 6/2009 | Trimbur et al. | 435/134 |
| 2009/0158739 A1* | 6/2009 | Messmer | 60/648 |
| 2009/0173386 A1* | 7/2009 | Bowers et al. | 137/1 |
| 2009/0173404 A1* | 7/2009 | Bowers et al. | 137/561 R |
| 2009/0173801 A1* | 7/2009 | Bowers et al. | 239/14.1 |
| 2009/0175685 A1* | 7/2009 | Bowers et al. | 405/52 |
| 2009/0177569 A1* | 7/2009 | Bowers et al. | 705/35 |
| 2009/0183424 A1* | 7/2009 | Gorbell et al. | 44/505 |
| 2009/0188127 A1* | 7/2009 | Gorbell et al. | 34/388 |
| 2009/0189617 A1* | 7/2009 | Burns et al. | 324/649 |
| 2009/0194269 A1* | 8/2009 | Vinegar | 166/60 |
| 2009/0194282 A1* | 8/2009 | Beer et al. | 166/272.7 |
| 2009/0194286 A1* | 8/2009 | Mason | 166/302 |
| 2009/0194287 A1* | 8/2009 | Nguyen et al. | 166/302 |
| 2009/0194329 A1* | 8/2009 | Guimerans et al. | 175/17 |
| 2009/0194333 A1* | 8/2009 | MacDonald | 175/45 |
| 2009/0194524 A1* | 8/2009 | Kim | 219/544 |
| 2009/0200022 A1* | 8/2009 | Bravo et al. | 166/256 |
| 2009/0200023 A1* | 8/2009 | Costello et al. | 166/260 |
| 2009/0200025 A1* | 8/2009 | Bravo | 166/265 |
| 2009/0200031 A1* | 8/2009 | Miller et al. | 166/302 |
| 2009/0200290 A1* | 8/2009 | Cardinal et al. | 219/488 |
| 2009/0200854 A1* | 8/2009 | Vinegar | 299/5 |
| 2009/0214992 A1* | 8/2009 | Mcknight et al. | 431/12 |
| 2009/0223467 A1* | 9/2009 | McKnight et al. | 123/23 |
| 2009/0223612 A1* | 9/2009 | McKnight et al. | 149/21 |
| 2009/0227003 A1* | 9/2009 | Blotsky et al. | 435/257.1 |
| 2009/0255144 A1* | 10/2009 | Gorbell et al. | 34/385 |
| 2009/0274985 A1* | 11/2009 | Mcknight et al. | 431/36 |
| 2009/0286295 A1* | 11/2009 | Medoff et al. | 435/162 |
| 2009/0318572 A1* | 12/2009 | Sakai et al. | 518/700 |
| 2010/0055629 A1* | 3/2010 | McKnight et al. | 431/12 |
| 2010/0087687 A1* | 4/2010 | Medoff | 568/840 |
| 2010/0108567 A1* | 5/2010 | Medoff | 208/49 |
| 2010/0112378 A1* | 5/2010 | Deininger et al. | 428/702 |
| 2010/0124583 A1* | 5/2010 | Medoff | 426/2 |
| 2010/0139116 A1* | 6/2010 | Carin et al. | 34/516 |
| 2010/0151112 A1* | 6/2010 | Franklin et al. | 426/656 |
| 2010/0151535 A1* | 6/2010 | Franklin et al. | 435/128 |
| 2010/0151538 A1* | 6/2010 | Franklin et al. | 435/134 |
| 2010/0151539 A1* | 6/2010 | Franklin et al. | 435/134 |
| 2010/0151567 A1* | 6/2010 | Franklin et al. | 435/320.1 |
| 2010/0179315 A1* | 7/2010 | Medoff | 536/123.13 |
| 2010/0229725 A1* | 9/2010 | Farsad et al. | 96/74 |
| 2010/0230830 A1* | 9/2010 | Farsad et al. | 261/20 |
| 2010/0236242 A1* | 9/2010 | Farsad et al. | 60/685 |
| 2010/0252648 A1* | 10/2010 | Robinson | 239/14.1 |
| 2010/0269860 A1* | 10/2010 | Vogel | 134/10 |
| 2010/0275781 A1* | 11/2010 | Tsangaris et al. | 96/108 |
| 2010/0320379 A1* | 12/2010 | Morrisroe | 250/288 |
| 2010/0326075 A1* | 12/2010 | Fong et al. | 60/650 |
| 2010/0329903 A1* | 12/2010 | Fong et al. | 417/398 |
| 2011/0023488 A1* | 2/2011 | Fong et al. | 60/659 |
| 2011/0023977 A1* | 2/2011 | Fong et al. | 137/340 |
| 2011/0030359 A1* | 2/2011 | Fong et al. | 60/327 |
| 2011/0030552 A1* | 2/2011 | Fong et al. | 92/144 |

FOREIGN PATENT DOCUMENTS

| | | |
|---|---|---|
| DE | 3321245 A1 * | 12/1984 |
| DE | 3327931 A1 * | 2/1985 |
| DE | 3417104 A1 * | 4/1985 |
| DE | 3406865 A1 * | 8/1985 |
| DE | 3535721 A1 * | 4/1986 |
| DE | 4228454 A1 * | 3/1994 |
| DE | 4237350 A1 * | 5/1994 |
| DE | 19806318 A1 * | 8/1999 |
| DE | 19813477 A1 * | 10/1999 |
| DE | 10125960 A1 * | 12/2002 |
| EP | 237372 A1 * | 9/1987 |
| EP | 519173 A1 * | 12/1992 |
| EP | 675525 A1 * | 10/1995 |
| EP | 1001038 A1 * | 5/2000 |
| EP | 1013728 A1 * | 6/2000 |
| EP | 2186431 A1 * | 5/2010 |
| FR | 2788708 A1 * | 7/2000 |
| GB | 2186287 A * | 8/1987 |
| JP | 55065860 A * | 5/1980 |
| JP | 55147170 A * | 11/1980 |
| JP | 56003847 A * | 1/1981 |
| JP | 56010617 A * | 2/1981 |
| JP | 56062858 A * | 5/1981 |
| JP | 57041335 A * | 3/1982 |
| JP | 59209150 A * | 11/1984 |
| JP | 60061022 A * | 4/1985 |
| JP | 60228690 A * | 11/1985 |
| JP | 61039371 A * | 2/1986 |
| JP | 61074879 A * | 4/1986 |
| JP | 61113668 A * | 5/1986 |
| JP | 61113670 A * | 5/1986 |
| JP | 61113671 A * | 5/1986 |
| JP | 61113673 A * | 5/1986 |
| JP | 2000130942 A * | 5/2000 |
| WO | WO 2005002346 A2 * | 1/2005 |
| WO | WO 2009031812 A2 * | 3/2009 |

* cited by examiner

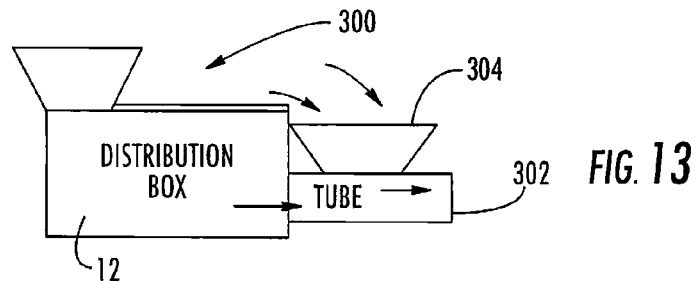
FIG. 13
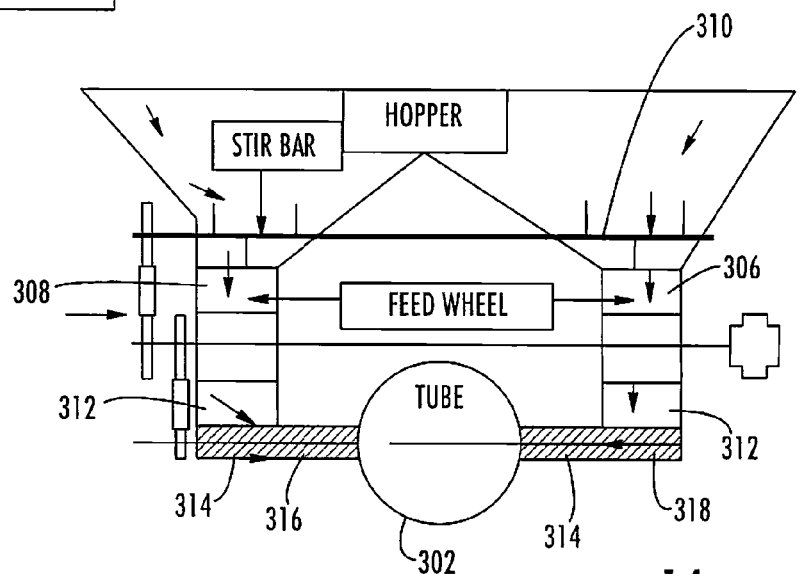
FIG. 14
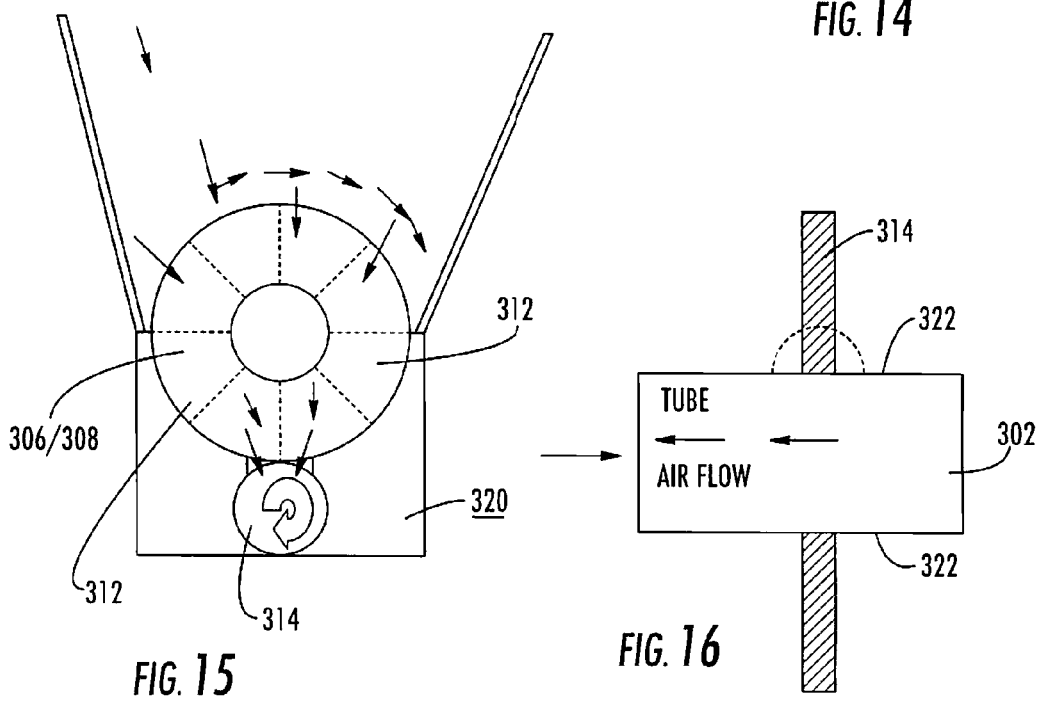
FIG. 15
FIG. 16

SYSTEM AND METHOD EMPLOYING TURBOFAN JET ENGINE FOR DRYING BULK MATERIALS

CROSS-REFERENCE TO RELATED APPLICATIONS

This application is a continuation-in-part of U.S. Utility application Ser. No. 11/194,488, filed Aug. 1, 2005 and issuing as U.S. Pat. No. 7,178,266, which itself is a continuation application of U.S. Utility application Ser. No. 10/975,032, filed Oct. 27, 2004 and issuing as U.S. Pat. No. 6,944,967, which claims the benefit of U.S. Provisional Application No. 60/514,477, filed Oct. 27, 2003, the disclosures of which are hereby incorporated by reference herein in their entireties, all commonly owned.

FIELD OF THE INVENTION

The present invention generally relates to industrial dryers and in particular to a dryer employing a turbofan jet engine as a source of heat and air.

BACKGROUND OF THE INVENTION

Many different types of commercial and production endeavors require that a primary product produced and/or by-products thereof are to be dried at a stage after production process. Drying is generally needed in, for example, food processing, fertilizer production, sludge removal and processing, chip and bark processing, agriculture manure processing, and in the processing of distiller's grain, cotton, soybean hulls, mine tailings, coal fines, pellets and powders employed in nuclear waste water cleaning, and many other applications.

By way of example, equipment and systems used for drying or de-watering have been proposed over the years, and have met with varying degrees of success. Such equipment has taken the form of presses (particularly screw presses), centrifuges, gravity screens, and thermal dryers of varying configurations and energy sources. In many of these types of units, drawbacks have included high purchase and operating costs, low output or throughput levels, a lack of range of drying ability, production of "burned" end product, and emissions control problems. In order for a new equipment design or approach to find some level of acceptability, the equipment should address one or more of the above drawbacks, and provide superior features over existing designs.

Many products, in order to serve their intended purpose, are subjected to thermal drying processes in order to reach the level of dryness necessary for use of the product. Thermal drying is, however, a high cost operation. For cost reasons, many products can only be partially dried by known methods, as the price that such products are able to command does not allow for the cost of thermal drying. In many instances, these partially dried products could have a more beneficial use if the cost of drying were lower.

Many, if not most, refined products are thermally dried. There have been known efforts that attempted to develop a practical non-thermal air-drying system that would provide the necessary commercial production rates, but at a lower cost than that of thermal drying. The possibility exists that the end product would be of a higher quality, as well. It would appear that to date, known efforts have not yielded any truly promising systems or designs.

Embodiments of the present invention provide a system and method for achieving a high production rate, with drying comparable to known high-cost thermal drying, at a cost lower than that of known thermal drying equipment.

SUMMARY OF THE INVENTION

In view of the foregoing background, the present invention provides a process for producing a high quality dried product. In keeping with the teachings of the present invention, one embodiment may employ a power plant, in the form of a turbofan jet engine, in an air-drying system that may use both thermal and non-thermal air-drying. The power plant may produce large quantities of air and heat, and operate with efficiency and an operating cost that provides a system suitable for use in situations for which existing thermal drying systems are too costly to operate.

One dryer system of the present invention may include a turbofan jet engine housed within an air distribution chamber that directs the exhaust air and bypass air from the jet into a material drying tube arrangement. Material to be dried may be injected into the tube and is carried in the airflow stream, where it is dried through a combination of thermal drying from the heat content in the engine exhaust, and by the kinetic energy of air flowing past the material traveling through the tube arrangement. The tube arrangement may include one or more types of physical impediments designed to retard the speed of the solids flowing in the air stream through the tube and/or to create turbulence in the air stream, so that the material is further dried as the high speed air passes by at a higher relative velocity.

The air distribution chamber may include a material preheating system in the form of a material feed belt and material flipper, wherein the material feed belt is thermally coupled to a jet exhaust air chamber, by sharing a common wall through which heat transfer is achieved, by way of example. For wetter materials that are initially in a mostly flowable form, a heat exchange coil can be employed, with the material being pumped through the coil, and the coil and material moving therethrough heated by the jet exhaust.

The drying tube arrangement may include one or more drying cyclones, which are preferably designed to further impede the flow of material, so as to increase contact with the faster airflow through the tube arrangement. One or more product extraction cyclones may be provided at the terminal end of the drying tube arrangement.

A material feed system embodiment may include a hopper for feeding material downwardly into rotating, spoked feed cylinders, which move the material from a position below the hopper into a path of the drying tube arrangement. At this position, the airflow through the drying tube arrangement draws the material from the cylinders into the drying tubes.

BRIEF DESCRIPTION OF THE DRAWINGS

The above and other aspects of the present invention will be more clearly understood from the ensuing detailed description of he preferred embodiments of the present invention, taken in conjunction with the following drawings in which:

FIG. 13 is a schematic side view of an alternative embodiment of a material injector subassembly;

FIG. 14 is a schematic cross-sectional view of the FIG. 13 material injector subassembly;

FIG. 15 is a schematic side elevation view of a feed wheel and auger suitable for use with the FIG. 13 material injector subassembly;

FIG. 16 is a schematic top plan view of the auger of the FIG. 13 material injector subassembly, coupled to a tube carrying drying air therethrough;

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternate embodiments.

Figure 1:
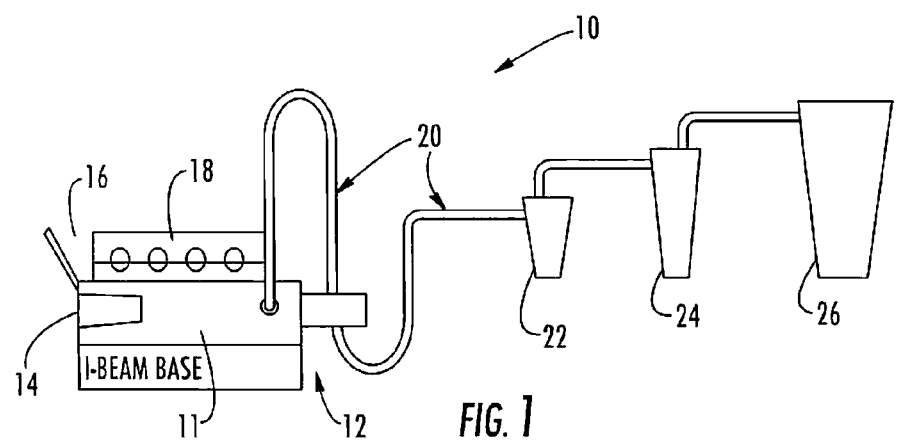
FIG. 1 is a generally schematic side view of the system according to one embodiment of the present invention.

Referring initially to FIG. 1, elements forming one embodiment of the present invention including an air-dryer system 10 are shown. A housing 12 includes an air distribution chamber 11 is provided at the front end of the system 10. The chamber 11 has mounted therein a jet engine 14, such as a turbofan jet engine, by way of example.

The structure and operating characteristics of turbofan engines are generally known in the art. By way of example, a turbofan engine has a core engine and a bypass duct that directs most of the airflow around the core engine or turbojet, where it is ejected through a cold nozzle surrounding a propelling nozzle at the exit of the core engine. The bypass air is at a lower temperature and a relatively lower velocity, compared with the air exiting the core engine. As is well known in the aviation art, the use of bypass airflow makes the turbofan engine considerably more fuel-efficient than a pure turbojet engine.

The specific operating and performance parameters and characteristics of the turbofan engine to be used in the system 10 of the present invention will likely vary depending upon the size/capacity of each particular drying system that is designed and engineered for a specific drying application. It is anticipated, however, that the design of a given dryer system will be driven in part by selection of commercially available turbofan engines.

With reference again to FIG. 1, the chamber 11 may be on the order of eight (8) feet in height, by 7.5 feet in width, by about twenty-four (24) feet in length. The chamber 11 illustrated in FIG. 1 has a hopper 16 and a preheating unit 18 disposed at an upper surface of the housing 12. The preheating unit 18 is coupled to housing 12 such that heat generated by the turbofan engine 14 is transferred to the material to be dried, thereby elevating the temperature of the material and bringing the water or other liquids contained in the material to be dried closer to an evaporation point.

The system 10 may further comprise an addition of what may be referred to as a "hollow surround" wherein an injection of additional hot air, steam, hot water, or other heating processes is made to aid in the drying process using heat transfer to heat the solids being dried.

FIG. 1 also illustrates a drying tube 20 into which the material to be dried is introduced. As discussed in greater detail later, the drying tube may include protrusions or other obstacles to slow the speed of the material to be dried relative to the airflow velocity of the jet air. Also shown in FIG. 1 are two drying cyclones 22, 24, in which the solid material is further slowed by protrusions disposed on the inside of the cyclone wall. The solid material may also be broken up by the protrusions. The material and airflow are carried through the two drying cyclones 22, 24 to a separating cyclone 26 which is generally a final step for separating the material from the airflow, and removing the material as a finished product from a lower portion of the cyclone 26. The drying cyclone and the separating cyclone may include at least a portion of elements that are similar depending on the needs of the system 10. The length or amount of drying tube to be employed, as well as the number and size of the drying cyclones to be used will be determined as the equipment design and layout is undertaken for each particular application in which the system 10 is to be used.

Figure 2:
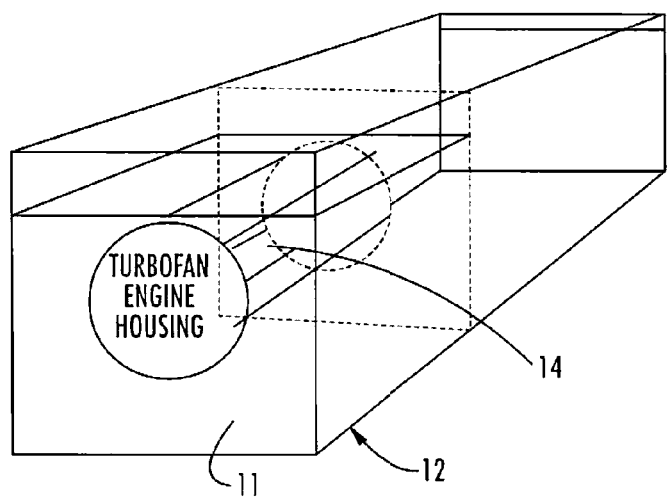
FIG. 2 is a generally schematic view of the housing for the power plant according to an embodiment of the present invention.

The schematic view of the chamber 11 in FIG. 2 is provided by way of example to show one general positioning of the turbofan jet engine 14 in the chamber. The jet engine 14 may be mounted in an appropriate manner at one end of the chamber 11, with the engine having its air intake at the outer periphery of the chamber. In one embodiment, all or a portion of the intake air to the engine is air that is recovered from the product separating cyclone at the terminal end of the process, and is treated prior to returning it to the inlet of the jet engine 14.

Figure 3:
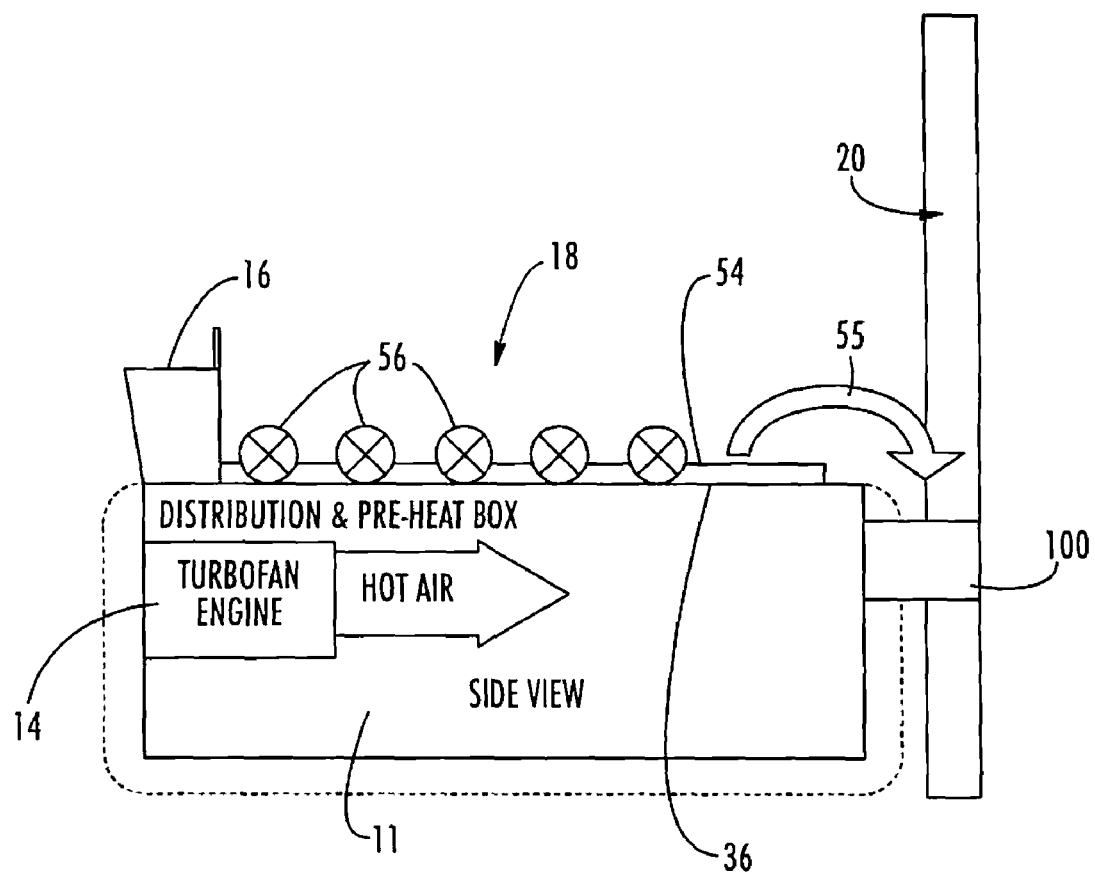
FIG. 3 is a substantially schematic side view of the housing and feed system.
Figure 4A:
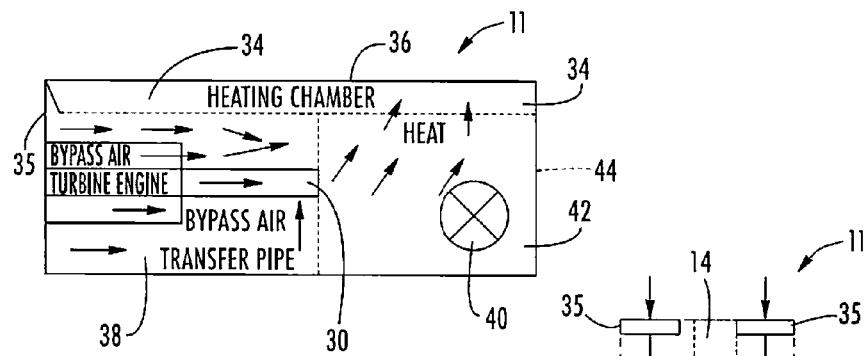
FIG. 4A and FIG. 4B are schematic views illustrating airflow through a housing in accordance with an embodiment of the present invention.
Figure 4B:
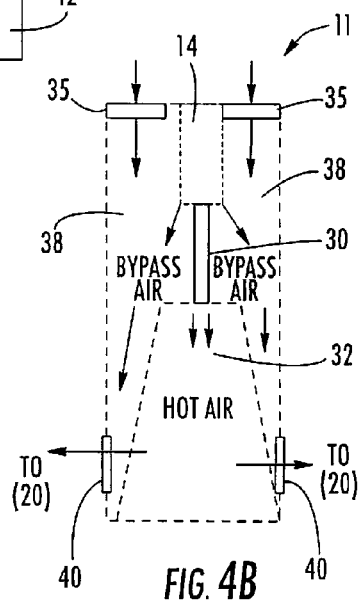

With continued reference to FIGS. 1 and 2, and to FIGS. 3, 4A and 4B, it can be seen that the air distribution chamber 11, handles the high temperature, high velocity jet exhaust air, the jet engine bypass air, and an ambient airflow. The jet exhaust air may be passed through a transfer pipe 30 into a hot air duct 32, and passed upwardly into heating chamber 34. Heating chamber 34 will transfer heat to and through an upper wall 36 of the heating chamber 34. The engine exhaust air will then flow out of heating chamber 34 through 35, into an air mixing chamber 38, where the hot air is mixed with the engine bypass air, as well as, optionally, ambient air drawn into chamber 12 through one or more openings in the walls thereof. The vents can be controlled (i.e., opened or closed) as desired to regulate the pressure in heating chamber 34, as desired or as may be required. In the construction illustrated in FIGS. 1-4, the mixed air then passes through exit openings 40 (FIGS. 4A, 4B) disposed along each lateral wall 42, 44 of chamber 11, and into drying tube 20 (FIG. 1), that is connected to each of the exit openings 40.

FIG. 3 further illustrates a preheating apparatus 18, having a wet material hopper or bin 16, a feed belt 54, made of stainless steel, by way of example, in consideration of the temperatures that will be experienced, and a series of material flippers 56. In this embodiment, wet material may be fed to the bin or hopper 16, and may be deposited therefrom onto the feed belt 54. The feed belt 54 runs along an upper wall 36 of the heating chamber 34, earlier described with reference to FIG. 4A, and is either in contact with, or is spaced closely apart from the wall 36. As the feed belt 54 advances the material, the material flippers 56 rotate to lift and flip the material on the belt, so that different surfaces of the material are exposed to the heat emanating from the heating chamber 34.

With reference again to FIG. 3, once the material reaches the end of the belt 54, it has been pre-heated and/or dried to a some desired extent, and the material, herein illustrated with reference to arrow 55 is then deposited into a material injection box 100, which box operates to introduce the material into the airflow of the drying tube 20, in a manner that will be discussed in greater detail later herein.

Figure 5:
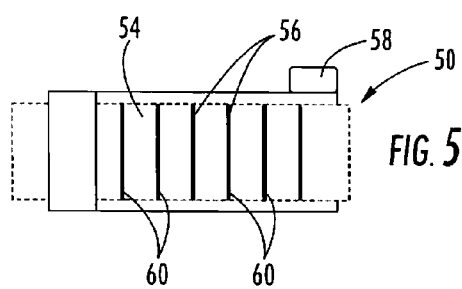
FIG. 5 is a schematic top view of a preheating and/or pre-drying subassembly in accordance with an embodiment of the present invention.
Figure 7:
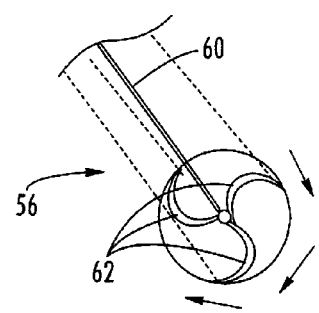
FIG. 7 is a perspective line drawing of the material flipper used in the FIG. 5 subassembly.
Figure 6:
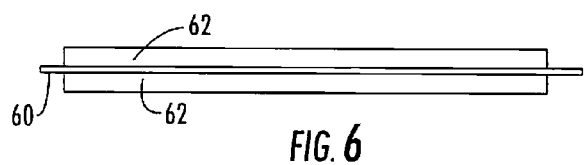
FIG. 6 is a side elevation view of a material flipper used in the FIG. 5 subassembly.

By way of example, reference is made to FIGS. 5-7 illustrating one construction of the preheating/predrying subassembly 50. The feed belt 54 may be driven by a motor and gearbox 58 in FIG. 5. The wet material bin or hopper 16 is disposed above the belt at its forward end. Each of shafts 60 is intended to show the position of the center shaft of a plurality of material flippers 56. As illustrated with reference to FIGS. 6 and 7, the material flippers 56 have the central shaft 60 and a plurality (three shown) of arcuate flipping blades 62 extending along a majority of the length of central shaft 60. The length of the blades 62 will preferably be determined to correlate to approximately the width of feed belt 54. The central shafts 60 of the material flippers 56 will be rotated by gearing, belt, or other drive coupling means, and as herein described, driven by either the motor/gearbox 58 or by an independent motor or drive means. The material flippers 56 may be rotated in a direction counter to the feed direction of the belt such that the blades operate to scoop and lift material from the feed belt, and deposit the material substantially on a side which was not previously in contact with the feed belt. The number of, and spacing between, the material flippers 56 will preferably be determined based upon the particular requirements and features of a given dryer unit. Consideration will generally be given to the length of time which the material should stay in contact with the belt to be heated and dried, and how many times a flipping or agitation to expose other portions of the material to the heat will affect the desired drying results.

Figure 8:
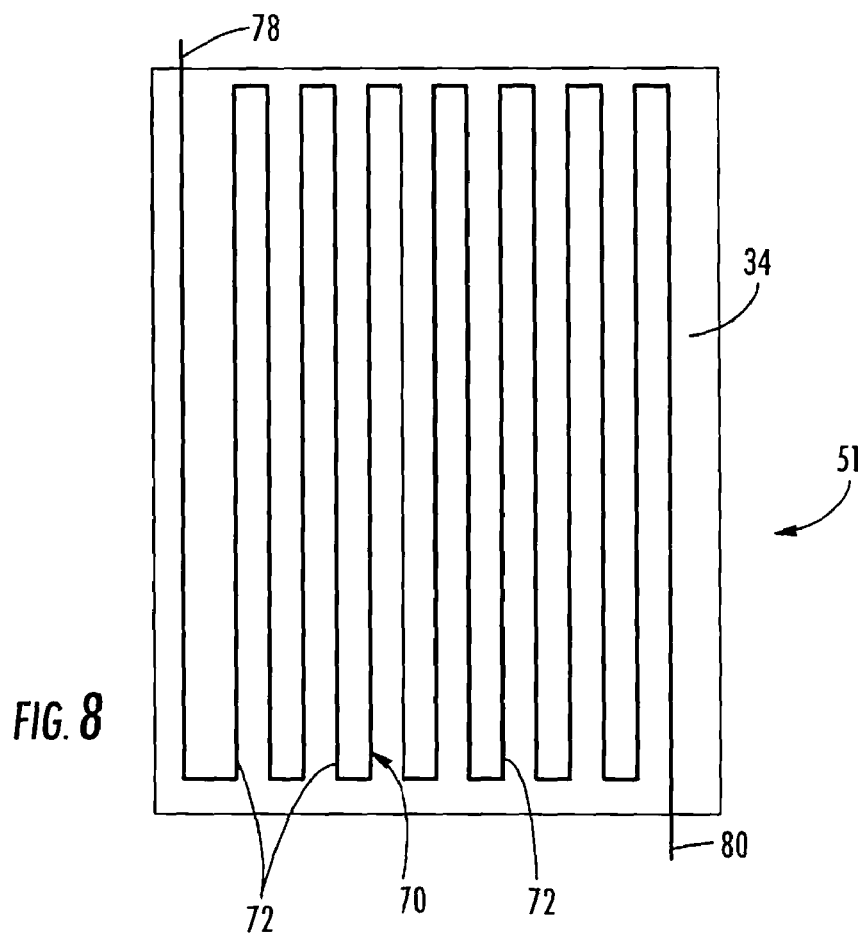
FIG. 8 is a schematic top plan view of an alternative embodiment of a preheating and/or pre-drying subassembly.
Figure 9:
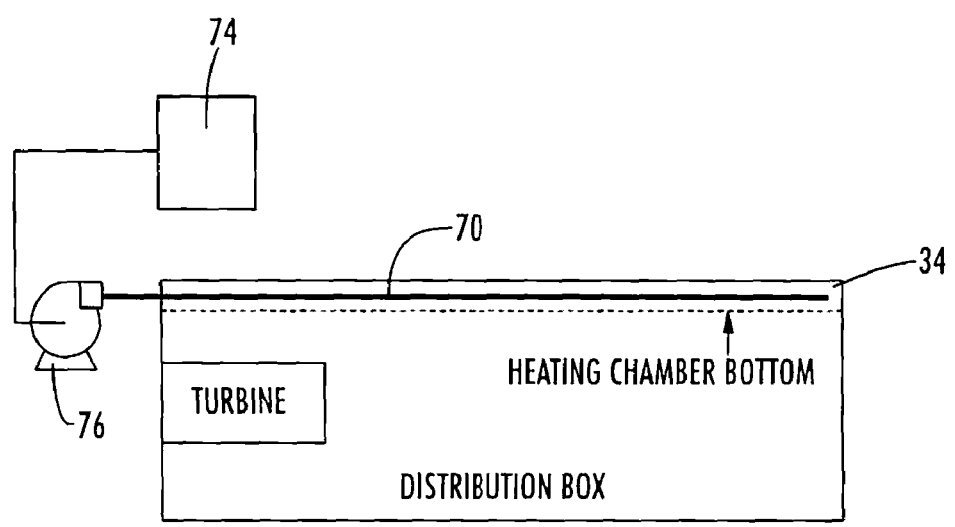
FIG. 9 is a schematic side view of the housing/chamber incorporating the FIG. 8 preheating and/or pre-drying subassembly.

FIGS. 8 and 9 illustrate an alternative preheat design that takes advantage of a large thermal capacity of the jet engine exhaust. In the place of the feed belt 54 earlier described with reference to FIG. 5, tubing or pipe construction, herein termed a coil 70, is provided in the heating chamber 34. The coil 70 may preferably comprise multiple straight runs of pipe or tubing 72 connected at alternate ends in a serpentine-type manner, through which wet material may be passed to be preheated and/or partially dried.

By way of example, the coil 70 may be used in place of the feed belt 54 preheat subsystem 50 particularly where the drying system 10 is designed to process wetter materials, such as those having an initial liquids content of greater than about 50%, or even higher. The high liquid-content (or low solids content) material may preferably be pumped from a holding tank 74 through the coil 70 by a positive displacement pump 76 having a variable drive, of a type known to those of ordinary skill in the art. Where such a preheating coil subassembly 51 is employed with materials expected to exhibit higher viscosities, other material delivery equipment of an injection type, such as a concrete pump, may be employed.

The coil 70 may be mounted in the heating chamber 34 from the bottom, or may alternatively be suspended from the top of the chamber. FIG. 8 illustrates the tubing 72 running essentially parallel to the longitudinal direction of chamber 11, with an inlet 78 disposed at one end, and an outlet 80 at the other. Variations to this, such as other positioning of the inlet and outlet, and tubing orientation, such as extending transverse to the longitudinal direction of the chamber, are seen as being design choices available to persons of ordinary skill in the art, and within the scope of the invention.

The material passing through the coil 70 is heated, such that the liquid may partially evaporate and become a separate phase from the wet solids material. The material emanating from the outlet 80 may be introduced into a large volume, low pressure area or chamber, where the heated liquid would be permitted to "flash" off as a separate vapor phase, leaving the material considerably drier as it is introduced into the main dryer.

If it is desired to provide the air-dryer system 10 for use in processing both a high liquids content and higher solids content materials, both the coil subassembly within the heating chamber and the feed belt subassembly atop the heating chamber may be combined and provided. Selection of which preheat system to use may be made based upon the properties of the material being introduced.

Figure 12:
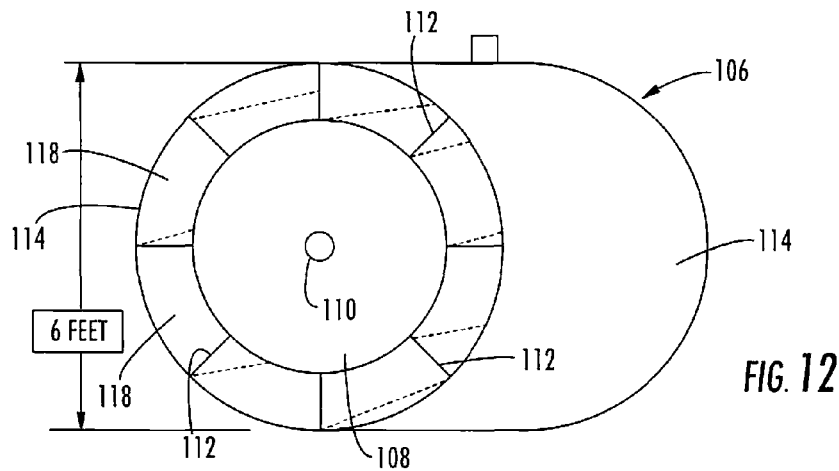
FIG. 12 is a perspective view of a feeder cylinder for use in the FIG. 10 material injector subassembly.
Figure 11:
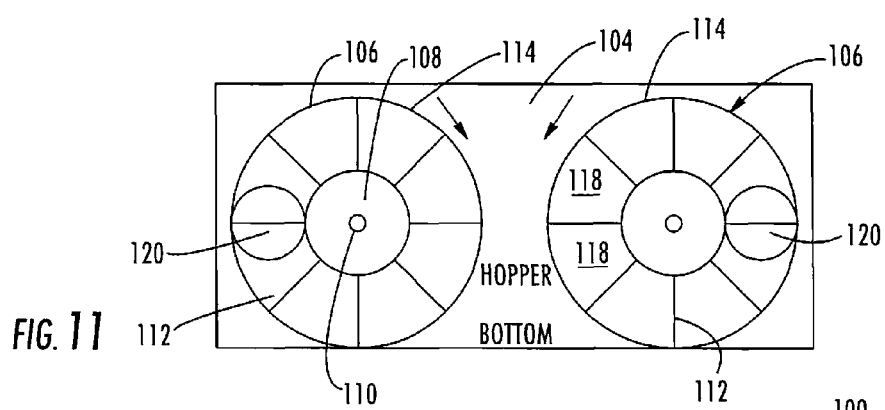
FIG. 11 is a schematic top plan view of the FIG. 10 material injector subassembly.
Figure 10:
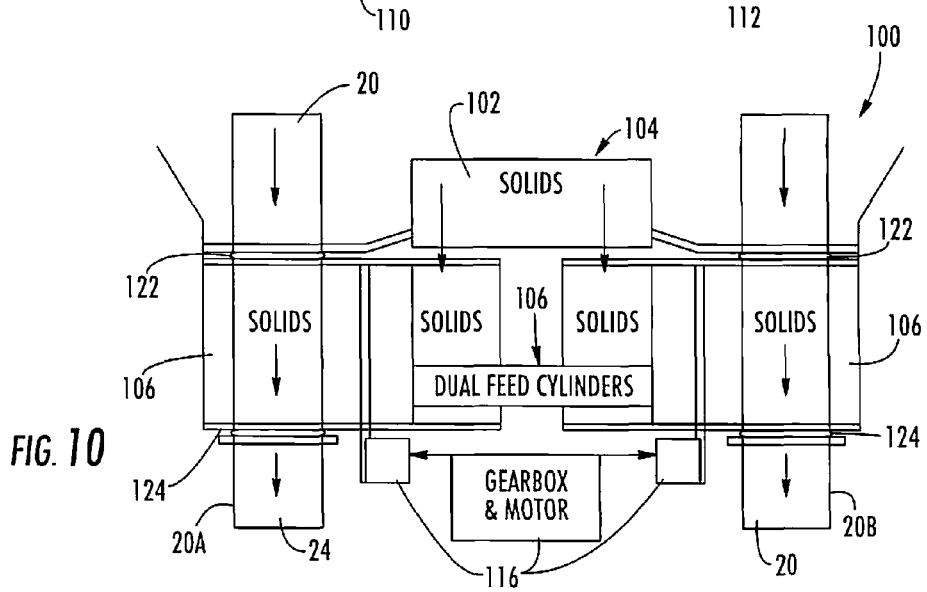
FIG. 10 is a schematic side elevation view of a material injector subassembly in accordance with an embodiment of the present invention

With reference now being made to FIGS. 10, 11 and 12, one embodiment of a material injector subassembly (box) 100 as earlier described with reference to FIG. 3, is herein described for introducing a mushy material (either preheated/predried or not) into the main drying tube assembly 20. This drying tube system, and as herein illustrated by way of example, may include multiple sets of tubing, which run along essentially identical paths (or mirror image paths), or, alternatively are joined together into a single tubing run at a desired point downstream of the material injector subassembly 100. The vertical tube sections of the drying tube both enhance the drying process and allow a footprint to be generally smaller than typical drying systems. If smaller drying capacities or throughput are desired, the system may be designed to have only one tube section and a single injector in the injector subassembly. Alternatively, the system 10 may be designed to run at half-capacity, wherein the material is fed to only one half of the material injector subassembly 100.

Illustrated with reference to FIG. 3, the material injector subassembly 100 may be located at an exit end of the feed belt 54, or at the exit to the preheating coil subassembly 51, when such equipment is present in place of feed belt 54. FIG. 10 illustrates schematically that the solids material is fed from the preheater subassembly 102 into injector hopper 104. Operating within hopper 104 is a pair of feeder cylinders 106.

As illustrated with reference to FIG. 11, the feeder cylinders 106 include a drum core 108 affixed to a drive shaft 110. Extending radially outwardly from the drum core 108 is a plurality of spokes 112, and, attached at an outer periphery of the spokes is an outer cylinder wall 114.

As illustrated with reference again to FIG. 10, the feeder cylinders 106 are coupled to a gearbox and motor assembly 116, which operates to rotate the feeder cylinders 106 inside of hopper 104. The material to be dried is deposited into hopper 104, at a central portion thereof. The material may substantially fill each sector 118 formed by the spokes 112 extending between the drum core 108 and the outer cylinder wall 114, as each sector rotates through the central portion of the hopper. The sectors 118 carry the material from the central portion of the hopper 104 to a position at the outer portion of the hopper which is in alignment with, and open to, the two sets of tubing 20A, 20B of the drying tube assembly 20. As the sectors rotate into alignment with openings 120 in the hopper 104, which openings are in alignment with and sealed to tubing sections, the material will, by force of the air stream flowing through tubing 20, and/or gravity, exit out of the hopper and into the drying tube 20. The diameter of the tube 20 may be increased or decreased to change the airflow speed within the tube. As will be recognized from viewing FIG. 11 in particular, the material will be fed substantially continuously into the drying tube 20, as the spokes are continuously advancing new material toward the openings 120.

It will be recognized that the material injector herein described by way of example, may be sized and operated for various feed rates or capacities, as an ordinary exercise in engineering. In the system 10, for example, in which drying tubing 20A, 20B has a 24" diameter, the feeder cylinders 106 may preferably be six (6) feet in outer diameter, the drum core may be two (2) feet in diameter, thus resulting in the spokes 112 being 24 inches in length, correlating to the 24-inch diameter of tubing (see FIG. 11). With the material injector equipment so sized, and with the feeder cylinders 106 rotating at a speed of one (1) revolution every eight (8) minutes, the equipment is capable of delivering about 20 tons of material per hour into the drying tube assembly 20.

With reference again to FIG. 10, at the upper and lower portions of hopper 104, appropriate seals 122, 124 are provided that abut the upper and lower surfaces of the feeder cylinders 106, so as to contain the material deposited in sectors 118 as the feeder cylinders turn. By way of example, the seals 122, 124 may preferably be made of Delrin®, which will also serve to lubricate the regions of contact between the cylinders and seals. Other materials may be employed, as will be recognized by persons of ordinary skill in the art.

An alternative material injector subassembly 300 is illustrated with reference to FIGS. 13-16. The housing 12 for the turbofan engine 14 has a single, substantially horizontally oriented, tube 302 that is coupled to the drying tube assembly described earlier with reference to FIG. 1. A hopper 304 is positioned to receive material from a preheat section, such as the feed belt apparatus 18 illustrated in FIG. 3. Hopper 304 has one or more, and for the embodiment herein illustrated by way of example, at least two feed wheels 306, 308 at a lower extent thereof. The material to be dried advances downwardly through hopper 304, and is optionally agitated by a stirring bar 310, and then enters sectors 312 of the vertically oriented rotating feed wheels 306, 308. It will be recognized, in viewing especially FIGS. 14 and 15, that feed wheels 306, 308, have spokes extending radially from a central core, but are open at the periphery to receive the material therein. Thus, the construction may be similar to that of feeder cylinders 106, but without using outer cylinder wall.

Feed wheels 306, 308 rotate around a horizontal axis, and deliver material to an auger 314 having blades 316, 318 canted to advance the material inwardly into tube 302, and into the air stream exiting housing 12. FIG. 15 illustrates that feed wheels 306, 308, and auger 314 may be mounted in a structure 320 that serves as an air lock, which prevents the air flowing through tube 302 from exiting out through the material injector subassembly 300.

After material is dumped out of each successive sector 312 of the rotating feed wheels into auger 314, auger rotates to advance the material inwardly toward tube 302. As can be seen in FIG. 16, tube 302 may be provided with a vane or vanes 322, or other flow restrictor, to provide a venturi effect at the area where auger empties into tube 302. The vanes may be disposed only at the area immediately upstream of the auger entry openings, or may be provided around the entire inner diameter of the tube 302 in this region.

Figure 17:
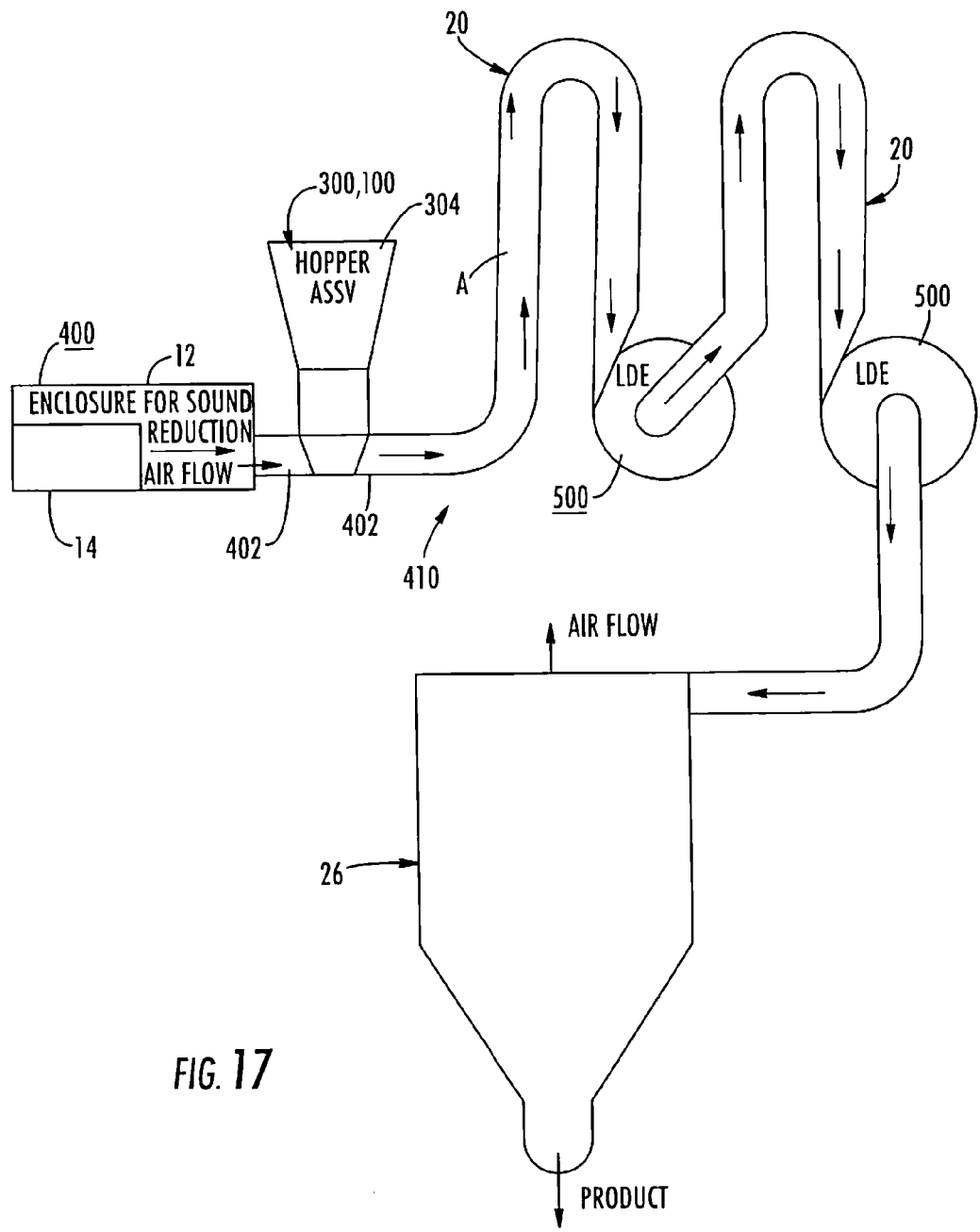
FIG. 17 is a schematic side elevation view of an alternative preferred embodiment of a drying system in accordance with teachings of the present invention.

FIG. 17 illustrates an alternative preferred variation on the unit illustrated in FIGS. 13-16. In this embodiment, no preheater subassembly is provided, in that there are some potential applications for this system 10 which will not require a preheating stage. In this embodiment, the housing 400 will not generally serve as an air distribution box, and is provided principally for noise reduction, with appropriate sound insulation. Engine exhaust air and engine bypass air, as well as any ambient bypass air brought into the housing 400, are joined and sent directly into tube 402, which is coupled to a drying assembly 410. As illustrated with continued reference to FIG. 17, by way of example, housing 12 may contain sound reducing materials to render the housing soundproof.

In this embodiment, one material injector subassembly 300 may be that herein described and illustrated with reference to FIGS. 13-16. Material will enter tube 402 from an auger 314, (FIG. 14), and the material will become entrained in the air stream exiting housing 400, and conveyed to the drying tube assembly. Material may be fed to the hopper 304 by a material conveyor or any other suitable means, by way of example.

The above-described material injector subassemblies may be used where the material to be dried is either a mushy solid, a pretreated material that contains on the order of 35% solids, or super-hydrated materials. Other feed devices, such as positive displacement pumps with variable drives may be used where the material is more fluid. Further, for higher viscosity materials, an injection device such as a concrete pump may be used.

By way of further example, once the material enters the drying tube assembly 20, one objective in obtaining the maximum of a desired level of drying in the system 10 is to maintain the airflow at as high a rate as the system will permit, while slowing down the material traveling through the drying tube assembly to a maximum extent possible, without causing clogging. This will permit both the thermal energy and the kinetic energy of the flowing air stream to operate to dry the material to a desired level.

One approach may involve simply using vertical tubing runs with an upward airflow, as would be the case in an initial tubing section in FIGS. 1 and 17 (section A). The material resists becoming fully entrained in the upward airflow through the tube 20 due to gravitational forces acting on the material. This approach is believed to be especially suitable for use when the material is at its wettest or heaviest condition, such as at a point shortly after being initially introduced into the drying tube 20.

Figure 17A:
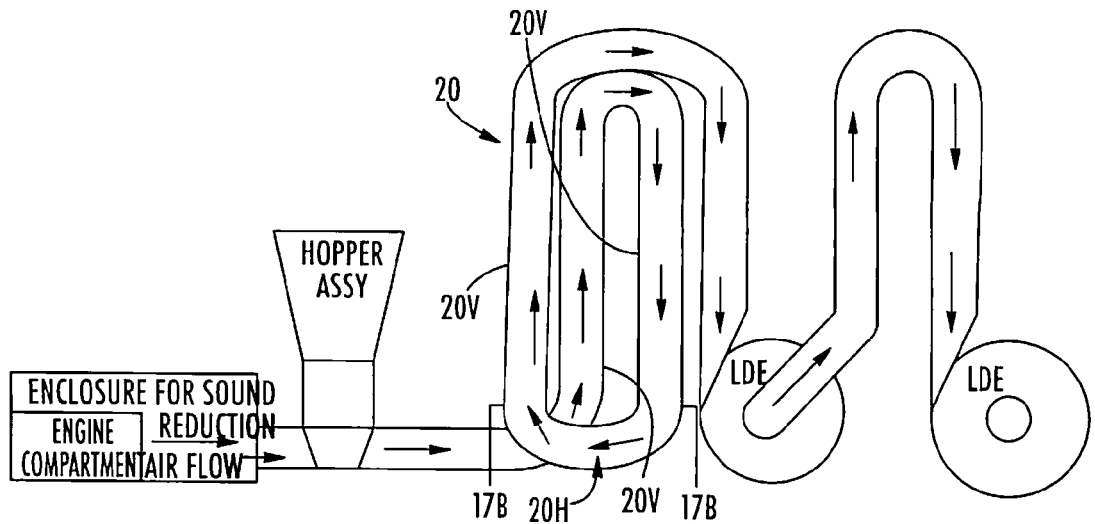
FIG. 17A is a diagrammatical illustration of one embodiment of the invention having multiple vertical tubing.
Figure 17B:
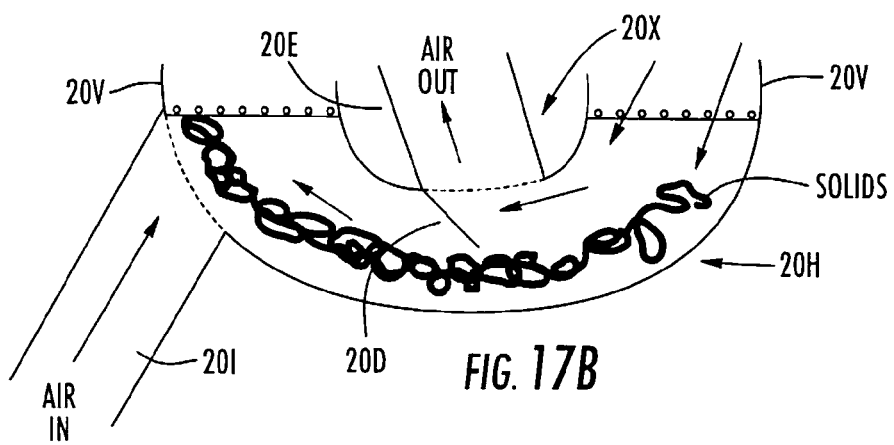
FIG. 17B is a partial cross-sectional view taken through lines 17B-17B of FIG. 17A, illustrating a the addition of dry air in an alternate embodiment.
Figure 18A:
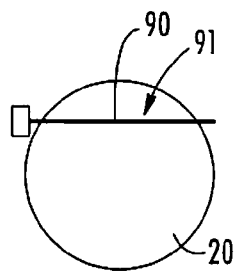
FIGS. 18A-18D are schematic cross-sectional views of a drying tube assembly employed in an embodiment of the present invention.
Figure 18B:
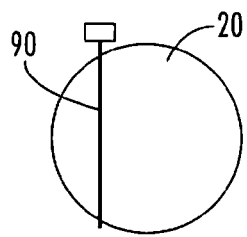
Figure 18C:
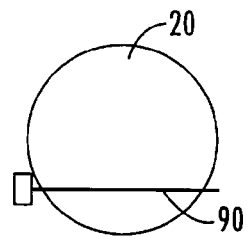
Figure 18D:
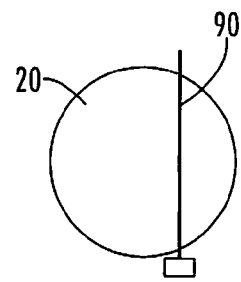
Figure 19A:
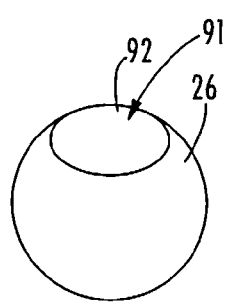
FIGS. 19A-19E are schematic cross-sectional views of a drying tube assembly employed in an alternative embodiment of the present invention.
Figure 19B:
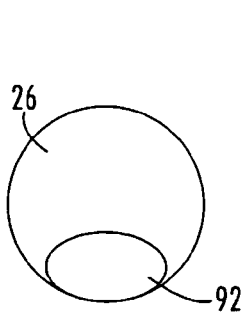
Figure 19C:
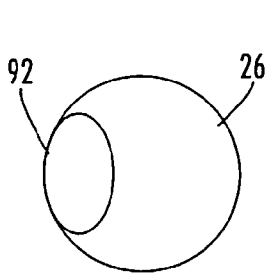
Figure 19D:
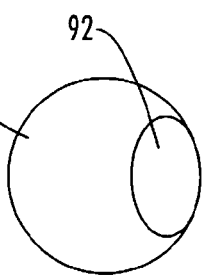
Figure 19E:
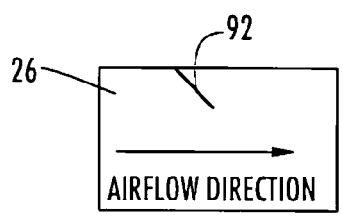

With reference to FIGS. 17A and 17B for an alternate embodiment of the drying tube 20, vertical portions 20V of the drying tube (as long as determined practical) may have an air exchanger 20X positioned at a lower portion thereof at a connecting horizontal portion 20H of the tube 20. For one example, the horizontal portion 20H has an arcuate shape between cooperating connecting vertical portions 20V. The air exchanger 20X removes "wet" air and replaces the wet air with dry air to improve drying efficiency. Several such exchangers 20X may be placed as warranted. In addition to the exchanger 20X and to the drying cyclones 22, 24, modifications may be made to the lateral drying elements, later described in detail, and as illustrated with reference to again FIG. 17 to create air exchange. By way of example only, the portion of the tube 20 illustrated with reference to FIG. 17B represents a bottom of the above units. The solids are pushed to the outside of the tube 20 by centrifugal force as the material changes direction from downward to upward. At the inlet 20I, the new air (dry warm air) will be provided at a similar volume as that removed at the exit 20E. The insertion angle of the inlet 20I will vary depending on need. Further, a damper 20D is provided to aid in airflow control.

Another approach may involve the use of physical obstructions within the drying tubing runs for decelerating the movement of the material solids. FIGS. 18A-18D, 19A-19E, and 20A-20D, illustrate some examples as to how this approach could be implemented.

FIGS. 18A-18D represent, schematically, cross-sections of a drying tube 20 at successive positions along the length of the tube. A plurality of rods 90, providing a baffle 91, may be made of steel or other material, and may be positioned to protrude across a portion of the cross-sectional area inside the tube. The rods would preferably be positioned to be perpendicular to the flow direction, and, as seen in the successive views, may be rotated by 90° at each successive position, i.e., horizontal upper, vertical left, horizontal lower, vertical right, within the tube (as shown in FIGS. 18A-18D). Such a pattern may be repeated at several locations along the length of the tube.

The rods are positioned to impede the progress of solid materials passing thereby, by physically interfering with the passage of the material. It can be seen in viewing all of FIGS. 18A-18D collectively that a central area of the tube 20 may not have the rods 90 or other physical impediments such that the airflow may continue substantially unimpeded while various portions of the material will collide with the rods 90 as the material is advanced by the air stream. The rods may, alternatively, be positioned at angles, orientations, and positions that are not illustrated, as desired.

FIGS. 19A-19E illustrate an alternative embodiment in which material flow is impeded by placement of physical obstacles. An alternate baffle 91 may comprise a plurality of flaps 92 is provided. The flaps 92 may be constructed of steel or other material, and may be secured to an inner wall of the tube by weldment or other suitable fastening means. Flaps 92 may individually occupy approximately 25% of the cross-sectional area of the tube, or any lesser or greater percentage, as desired. The flaps 92 may preferably be canted or inclined in the direction of airflow through the tube (see FIG. 19E), such that the material impinging against each flap 92 will be allowed to slide free of the flap after being slowed by the collision with the flap. The positioning of the flaps 92 may be successively at different orientations relative to the previous flap. Thus, moving in the direction of airflow proceeding from FIGS. 19A-19D, the flaps may be positioned (in the orientation illustrated), in a top portion of the tube 20, a bottom portion, a left portion, and a right portion. Alternatively, the 90° rotation scheme used with the rods 90 in FIGS. 18 A-D could be employed. While the flaps 92 are shown as being somewhat fan-shaped or rounded, the shape is not seen as being critical to the proper operation of the flaps, and other shapes may perform equally as well.

Figure 20A:
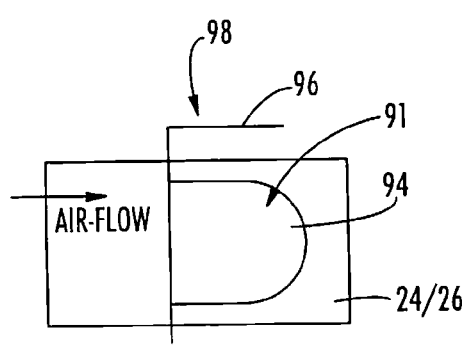
FIGS. 20A-20B are schematic cross-sectional views of a drying tube assembly according to an alternative embodiment of the present invention.
Figure 20B:
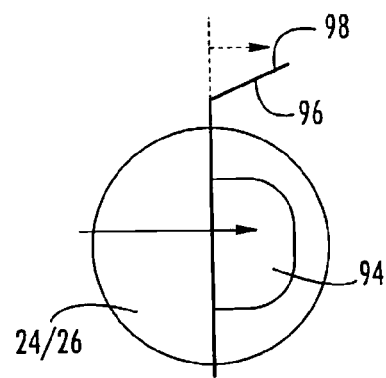
Figure 20C:
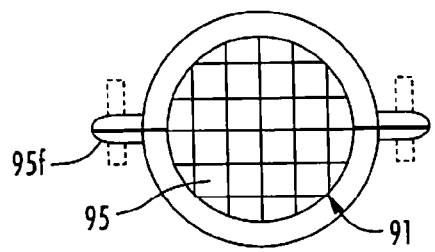
FIGS. 20C-20D are partial front views of screen styled embodiments used as a baffle in controlling and reducing the speed of material flowing through a tube.
Figure 20D:
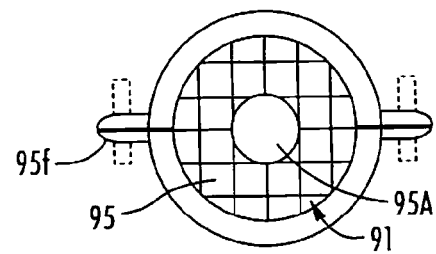

By way of example, FIGS. 20A and 20B illustrate yet an additional embodiment of a physical impediment to material flow. This embodiment of the baffle 91 employs a diverter flap 94 that is preferably mounted along a centerline of the cross-section of the tube, and is mounted by control arm 96 so as to be pivoted within the tube 20. As can best be seen in the cross-sectional view of FIG. 20B, the diverter flap 94 may be pivoted or rotated into varying positions to impede the flow of solid material (principally), to varying degrees. It is envisioned that a handle 98 extending from control arm 46 will be moved cyclically by an automated program and control means (not shown), such as solenoids and timers, to provide intermittent and varying degrees of blockage to one side of the tube, and then the other side of the tube. The handle 98 and diverter flap 94 are preferably positioned to lie in the same plane, such that the position of the handle at the exterior of the tube is representative of the position of the diverter flap 94 inside the tube. Yet further and as illustrated with reference to FIGS. 20C and 20D, the baffle 91 may include a screen 95 that may be fitted between adjoining tube flanges 95F and include a preselected screen mesh, or mesh with an aperture 90A. Those skilled in the art will appreciate that such structures and other related structures are effectively used to control material flow, now having the benefit of the teachings of the present invention.

Figure 21:
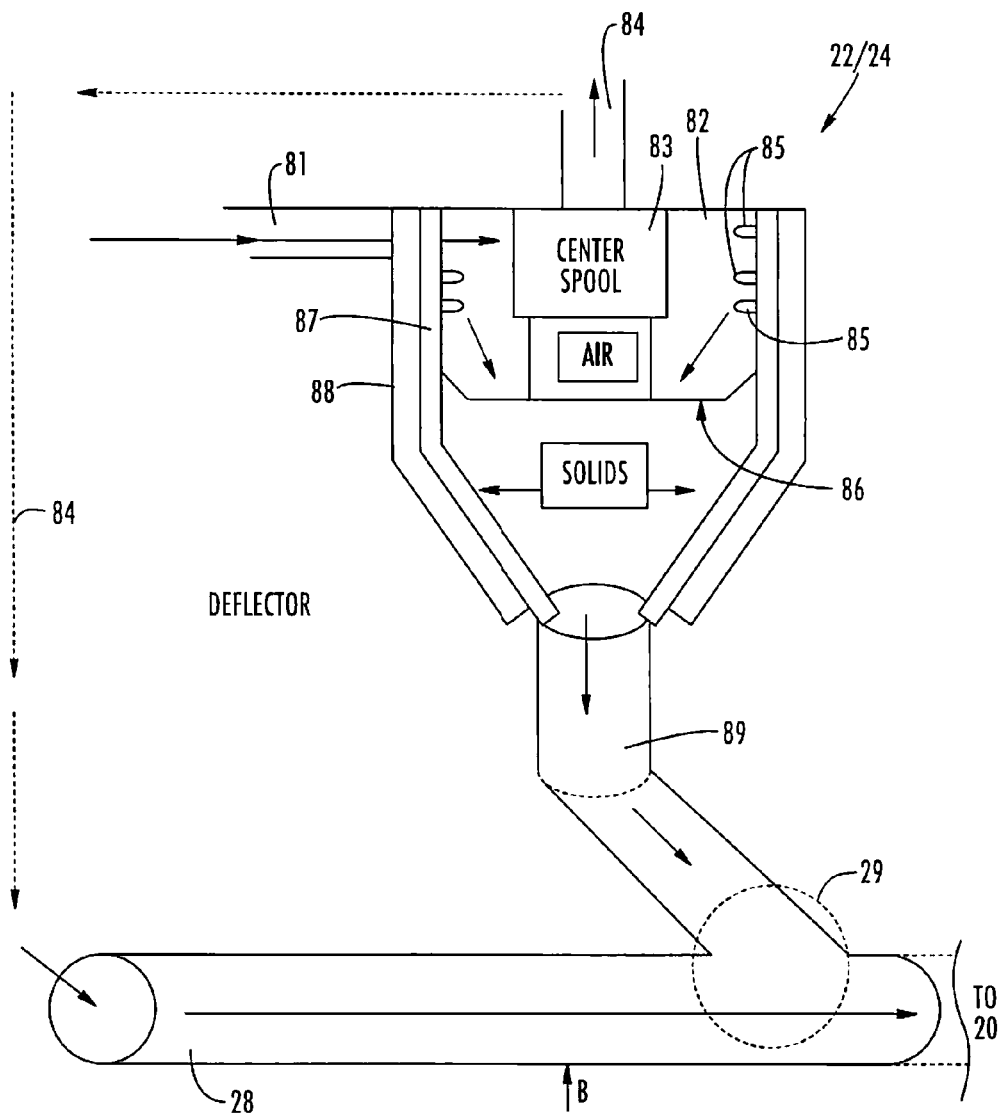
FIG. 21 is a schematic cross-sectional view of a drying cyclone which may be employed in accordance with one embodiment of the present invention.

With reference again to the schematic illustration of the system 10 in FIG. 1, the drying cyclones 22, 24, may be employed as a further means of retarding material flow while permitting the airflow to remain at higher rates. FIG. 21 is a schematic cross sectional illustration of one embodiment of such a cyclone 22, 24. The airflow with entrained material enters the cyclone, preferably tangentially, through inlet 81. The material spins in a circular motion in an upper portion 82 of the cyclone 22, 24, while a center spool 83 collects a majority of the airflow, and conveys the air through air line 84 to a continuation 28 of the drying tube 20.

The upper portion 82 may have hardened teeth 85 protruding from the walls to slow and breakup the solid material while moving toward the bottom of the cyclone. A deflector assembly 86 extending underneath center spool 83 and extending outwardly to the walls of the upper portion 82 of the cyclone may be provided to aid in controlling air and material flow.

The walls 87 of cyclone 22, 24 may be heated to enhance the drying/evaporation of the material coming into contact with the walls. Heating elements 88 may preferably be hot air chambers into which heated air from the airflow stream is passed, or any other type of heating element that will not significantly detract from the energy efficiency of the overall system 10.

As the material slows and falls to the lower portion of the cyclone, it exits through cyclone outlet 89. Cyclone outlet 89 is coupled to the continuation 28 of the drying tub 20, and deposits the material into the airflow. In one embodiment, the region in which the material reenters the airflow stream is configured such that a Venturi effect 29, area illustrated with dashed circle, can be achieved in tube 28 as the material is introduced, or immediately upstream thereof. It is envisioned that it may be necessary to introduce additional, or makeup air prior to the entry point where the material rejoins the air stream, as indicated by arrow B. The continuation of the tube 28 will convey the material further downstream to either a second drying cyclone 24, as illustrated with reference again to FIG. 1, through additional drying subassemblies, or to a material separating cyclone 26.

The size of the drying cyclone will likely vary for each dryer system 10 that is designed and engineered for different applications. The cyclone 24 or cyclones 24, 26 are employed, as noted, to increase the differential in speed between the main airflow and the material to be dried, and the size, including internal diameter and length, may be varied as a matter of routine engineering to achieve the desired effect.

Figure 24:
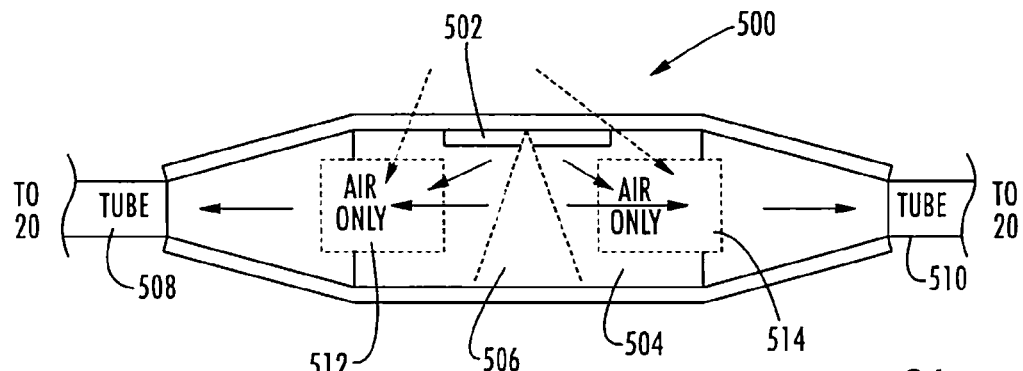
FIG. 24 is a schematic cross-sectional view taken through lines 24-24 of FIG. 22 of the lateral drying elevator in accordance one embodiment of the present invention.
Figure 23:
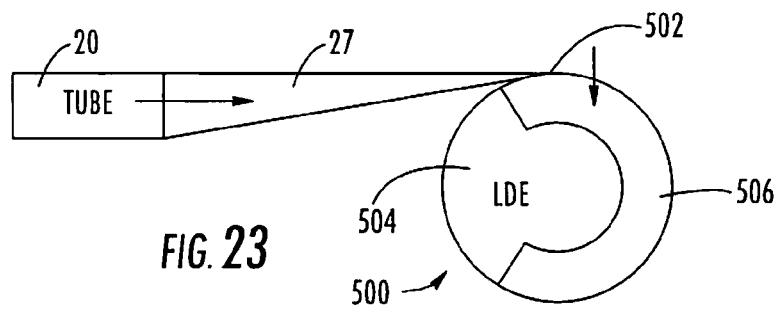
FIG. 23 is a schematic cross sectional view taken through lines 23-23 of FIG. 22 illustrating of one lateral drying elevator by way of example.
Figure 22:
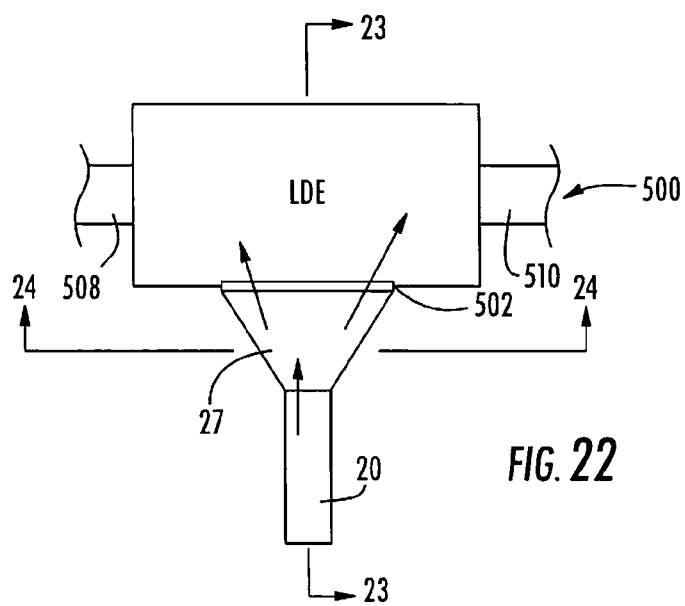
FIG. 22 is a schematic top plan view of a lateral drying elevator (LDE) and a flared inlet section of tubing connected to the LDE.

With reference again to FIG. 17, and now to FIGS. 22-24, a lateral drying element (LDE) 500 may advantageously be used in the dryer system 10 of the present invention. The LDE 500 has an inlet 502 extending into a generally cylindrical chamber 504. As can best be seen in FIGS. 22 and 23, the inlet 502 is coupled to the tube 20 by a flared tubing section 27 that includes a flattened cross-section through which the airflow and the material must pass. The air and material are introduced into chamber 504 substantially tangentially to the chamber. A wedge-shaped flow splitter 506 is provided at substantially the center of the longitudinal extent of chamber 504. The flow splitter 506 extends along an interior wall of the chamber 504 from a point substantially adjacent the inlet 502, and around approximately one-half to two-thirds of the inner periphery of chamber 504. The inlet 502 and the flow splitter 506 operate to divide incoming airflow and material into two approximately equal flow streams, and the air and solid material will travel around the interior of the LDE 500 several times before being advanced to outlet tubes 508, 510. As shown schematically in FIG. 22, the outlet tubes 508, 510 are recombined downstream into a continuation of the drying tube 20.

With continued reference to FIG. 24, internal tubes 512, 514 may optionally be suspended at the central area in the chamber 504, which will operate to more directly and more quickly direct the airflow of the incoming air and material toward the outlet tubes. As illustrated with reference again to FIG. 17, by way of example, one or more LDEs 500 may be positioned in the run of tubing 20, either in place of, or in addition to the one or more drying cyclones. The LDE 500 increases the dwell time or retention time of the air and material in the dryer. The LDE 500 may be oriented in any number of ways, as it is not ultimately wholly dependent on gravity to operate effectively.

Figure 25:
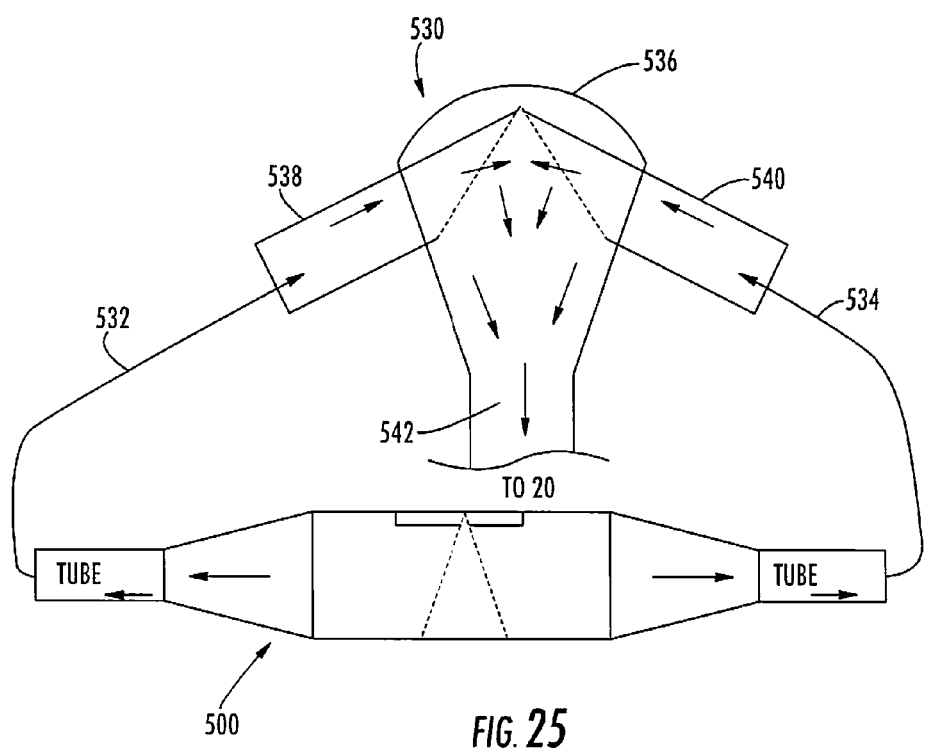
FIG. 25 is a schematic view of a particle collider in accordance with an embodiment of the present invention.

With reference to FIG. 25, a collision chamber 530 may be included in the air dryer system 10. This solids particle collision chamber 530 may preferably be used in tandem with the LDE 500, earlier described with reference to FIG. 22, in that the material leaving the LDE is split into two material streams, shown schematically at 532, 534. One collision chamber 530 may include a housing 536 and two inlet pipes 538, 540 positioned to direct first and second material streams 532, 534 toward one another within the housing, so that the solid particles of the material will collide into one another. With the speed of the particles expected to be on the order of 400 mph, and thus having a high momentum, the collisions induced will cause the particles to break up. This results in a reduction of the average particle size of the solid material, which in turn increases the exposed surface area of the solids material. The increased surface area will enhance the ability of the flowing air stream to dry the material. After the opposing material streams collide in housing 536, these streams may be united into a single stream flowing through an outlet 542. The outlet 542 may be coupled to the drying tube 20, with the airflow and the material carried therein continuing further downstream the dryer system 10.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A material drying system comprising:
    a turbofan jet engine providing airflow;
    a drying tube operable with the turbofan jet engine for receiving the airflow and material to be dried, wherein the drying tube comprises a plurality of vertical tube sections, and wherein at least two of the plurality of vertical sections is connected by a generally horizontal arcuate section, wherein the drying tube is dimensioned to allow airflow and material moving upward one vertical tube section to reduce a speed of the solids within the one tube section and the airflow and material are accelerated within a downward second vertical tube section to increase a centrifugal force on the material passing through the arcuate generally horizontal tube section thus improving separation of particles;
    an air exchanger operable at the arcuate tube section, wherein the air exchanger comprises an exit tube removing a substantial portion of wet air from the drying tube, and an inlet tube injecting dry air into the drying tube, the inlet tube positioned downstream the exit tube, the air exchanger sufficient for removing wet air from the drying tube and replacing the wet air with a similar volume of dry air thus improving drying efficiency while maintaining the airflow; and
    a cyclonic apparatus having a generally cylindrical chamber operable with the drying tube for receiving the material to be dried therefrom.

2. A system according to claim 1, further comprising a baffle extending sufficiently into the drying tube so as to retard a flow of the material axially along the tube.

3. A system according to claim 2, wherein the baffle extends into the drying tube at an angle generally perpendicular to a longitudinal axis of the tube.

4. A system according to claim 2, wherein the baffle comprises at least one of a rod, a flap, and a screen.

5. A system according to claim 1, wherein the cyclonic apparatus comprises at least one of a drying cyclonic apparatus and a separating cyclonic apparatus.

6. A system according to claim 1, wherein the cyclonic apparatus comprises:
    a generally cylindrical chamber extending along a vertical axis thereof;
    an inlet operable with the chamber, the inlet connected to the drying tube for receiving the material to be dried, wherein the inlet causes the material to tangentially enter the chamber such that the material spins in a circular motion in an upper portion of the chamber;

a spool positioned at a center portion of the chamber for collecting a substantial portion of the airflow and directing the airflow into the drying tube: and an outlet positioned within a lower portion of the chamber.

7. A system according to claim 6, wherein the cyclonic apparatus further comprises teeth protruding from an interior wall of the chamber, the teeth contacting the material and slowing down movement thereof, the teeth further breaking up the material while the material is moving toward a bottom portion of the chamber.

8. A system according to claim 6, further comprising a deflector extending under the spool and outwardly to a wall of an upper portion of the chamber, the deflector providing a controlling of airflow and material flow.

9. A system according to claim 6, further comprising a heater operable for heating the chamber to enhance drying and evaporation of the material within the chamber.

10. A system according to claim 6, wherein the outlet is coupled to the drying tube for depositing the material into the airflow therein.

11. A system according to claim 6, wherein a connection of the outlet with the drying tube results in a Venturi effect for the airflow at a juncture of the outlet of the chamber and the drying tube.

12. A system according to claim 1, further comprising a lateral drying elevator increasing a retention period for air and material within the system, the lateral drying elevator including:

an inlet extending into a generally cylindrical chamber, the inlet coupled to the drying tube;

a flared tubing section having a generally flattened cross-section through which the airflow and the material passes, wherein the flared tubing is such that the airflow and the material are tangentially introduced into the chamber:

a flow splitter carried within the chamber, the flow splitter dividing incoming airflow and material into separated flow streams, the air and solid material generally traveling around the interior of the chamber before being advanced to opposing outlet tubes; and at least two outlet tubes operable with the chamber.

13. A system according to claim 12, wherein the flow splitter extends along an interior wall of the chamber from a first location point substantially adjacent the inlet to a second location at least one-half the inner periphery of the chamber.

14. A system according to claim 12, further comprising a collision chamber operable with the lateral drying elevator, the collision chamber including:

a housing:

first and second inlet pipes operable with the at least two outlet tubes of the lateral drying elevator for directing first and second material streams toward one another within the housing, thus having solid particles of the material colliding; and an outlet of the collision chamber connected to the drying tube.

15. A system according to claim 1, wherein the turbofan jet engine provides bypass airflow, and wherein the bypass airflow provides at least a portion of the airflow to the drying tube, and wherein heated air from the turbojet engine provides another portion of the airflow to the drying tube.

16. A system according to claim 1, wherein the turbo jet engine comprises an air inlet port, and wherein airflow leaving the cyclonic apparatus is returned to the intake port.

17. A system according to claim 16, further comprising:

a transfer pipe operable for receiving the airflow; and a heating chamber operable with the transfer pipe for receiving the airflow therein, wherein an engine exhaust heats air of the airflow within the chamber, the chamber transferring heat to and mixing the air with the engine bypass air.

18. A system according to claim 1, further comprising a particle collider, wherein the particle size is reduced by a direct particle collision at near full speed.

19. A system according to claim 1, further comprising a hopper operable for injecting the material to be dried into the airflow.

20. A system according to claim 19, wherein the hopper comprises:

a feeder cylinder having a drum core affixed to a drive shaft a plurality of spokes outwardly extending from the drum core, the plurality of spokes forming sectors;

an outer wall attached at a periphery of the plurality of spokes;

a motor assembly operable with the cylinder for providing a rotation thereto, wherein the material to be dried is deposited into the hopper at a central portion thereof and at least partially fills each sector, and wherein the sectors carry the material from the central portion of the hopper to a position at an outer portion of the hopper to the drying tube.

21. A system according to claim 20, wherein the feeder cylinder comprises a pair of feeder cylinders.

22. A system according to claim 19, wherein the hopper comprises:

at least two wheels;

spokes extending radially from a central core of each wheel and open at a periphery for receiving the material therein; and an auger positioned for receiving the material from the at least two wheels, the auger having blades canted to advance the material into the drying tube.

23. A system according to claim 22, further comprising a flow restrictor operable with the auger for controlling delivery of the material into the drying tube.

24. A material drying system comprising:

a turbofan jet engine providing airflow;

a hopper operable for receiving material to be dried therein:

a drying tube operable with the turbofan jet engine for receiving the airflow and the hopper for receiving the material to be dried, wherein the drying tube comprises a plurality of vertical tube sections connected by upper and lower arcuate sections for providing a continuous flow of the material and the airflow through the drying tube;

an air exchanger operable at the lower arcuate section of at least one of the plurality of vertical tube sections, the air exchanger comprising an exit tube dimensioned for removing a substantial portion of wet air from the drying tube and an inlet tube positioned downstream the exit tube, the air exchanger removing wet air through the exit tube and replacing the wet air with dry air entering through an the inlet tube, thus improving drying efficiency; and a cyclonic apparatus having a generally cylindrical chamber operable with the drying tube for receiving the material to be dried therefrom.

25. A system according to claim 24, wherein at least two of the plurality of vertical sections are connected by a generally horizontal arcuate section, the arcuate section supporting centrifugal force on the material passing through the arcuate generally horizontal tube section thus improving separation of particles at the air exchanger.

26. A system according to claim 24, further comprising a baffle extending sufficiently into at least one of the plurality of vertical tube sections so as to retard a flow of the material axially along the tube.

27. A system according to claim 24, wherein the cyclonic apparatus comprises at least one of a drying cyclonic apparatus and a separating cyclonic apparatus.

* * * * *